(12) United States Patent
Sugawara

(10) Patent No.: US 11,462,892 B2
(45) Date of Patent: Oct. 4, 2022

(54) CABLE TERMINAL PROCESSING APPARATUS

(71) Applicants: Yazaki Corporation, Tokyo (JP); JAPAN CHAIN TERMINAL CO., LTD., Tendo (JP)

(72) Inventor: Daisuke Sugawara, Tendo (JP)

(73) Assignees: YAZAKI CORPORATION, Tokyo (JP); JAPAN CHAIN TERMINAL CO., LTD., Yamgata (JP)

(*) Notice: Subject to any disclaimer, the term of this patent is extended or adjusted under 35 U.S.C. 154(b) by 285 days.

(21) Appl. No.: 16/911,939

(22) Filed: Jun. 25, 2020

(65) Prior Publication Data

US 2020/0412114 A1 Dec. 31, 2020

(30) Foreign Application Priority Data

Jun. 28, 2019 (JP) .............................. JP2019-122299

(51) Int. Cl.
*H02G 1/12* (2006.01)
*G02B 6/44* (2006.01)

(52) U.S. Cl.
CPC ......... *H02G 1/1265* (2013.01); *G02B 6/4497* (2013.01); *H02G 1/127* (2013.01); *H02G 1/1268* (2013.01)

(58) Field of Classification Search
CPC .... H02G 1/1265; H02G 1/1268; H02G 1/127; H02G 1/12; H02G 1/1202; H02G 1/1248; H02G 1/1251; H02G 1/1256; H02G 1/1263; G02B 6/4497; Y10T 83/0443; Y10T 83/0453; Y10T 83/0524; Y10T 83/207; Y10T 83/8805; Y10T 83/8832; Y10T 83/8843

USPC ................. 81/9.51, 9.4, 9.41, 9.42
See application file for complete search history.

(56) References Cited

U.S. PATENT DOCUMENTS

| | | | | |
|---|---|---|---|---|
| 4,873,901 A | * | 10/1989 | Stoehr | H01R 43/05 81/9.51 |
| 5,010,797 A | * | 4/1991 | Stepan | H02G 1/1265 83/885 |
| 5,253,555 A | * | 10/1993 | Hoffa | H02G 1/1256 81/9.51 |
| 2008/0257112 A1 | * | 10/2008 | Stepan | G02B 6/4497 81/9.51 |
| 2013/0269487 A1 | * | 10/2013 | Sumino | H02G 1/1265 81/9.51 |
| 2016/0181774 A1 | * | 6/2016 | Viviroli | H02G 1/127 156/60 |
| 2017/0125988 A1 | | 5/2017 | Appenzeller | |

FOREIGN PATENT DOCUMENTS

JP 201793283 A 5/2017

\* cited by examiner

*Primary Examiner* — Phong H Nguyen
(74) *Attorney, Agent, or Firm* — Sughrue Mion, PLLC

(57) ABSTRACT

An axial direction moving mechanism has a function of moving the rotary head and the cable holding mechanism relative to each other in an axial direction of the rotation shaft, positions a blade edge of the peeling cutter and the cutting cutter in the axial direction with respect to the cable by moving and stopping, and peels the coating on a tip end side by moving the rotary head and the cable holding mechanism in a direction away from each other in a state where the blade edge of the peeling cutter is cut into the coating of the terminal portion of the cable.

9 Claims, 25 Drawing Sheets

CABLE TERMINAL PROCESSING APPARATUS

CROSS REFERENCE TO RELATED APPLICATIONS

This application is based on and claims priority from Japanese patent application No. 2019-122299 filed on Jun. 28, 2019, the entire contents of which are incorporated herein by reference.

BACKGROUND OF THE INVENTION

1. Technical Field

The present invention relates to a cable terminal processing apparatus for a coaxial electric wire and the like, and in particular, to a terminal processing apparatus that performs, in a series, peeling on a coating and trimming cut on a core wire after coating peeling.

2. Background Art

In general, a coaxial electric wire has a structure in which an outer periphery of a core wire is surrounded by an outer coat (insulating coating). The core wire includes a center conductor (inner conductor), an inner coat (dielectric) surrounding an outer periphery of the center conductor, and a braid (outer conductor) surrounding an outer periphery of the inner coat (hereinafter this whole portion is referred to as a core wire).

For example, in a case of attaching a coaxial electric wire terminal to a terminal portion of a coaxial electric wire of this type, it is necessary to peel a predetermined length of the outer coat from an end portion of the electric wire to expose the braid of the outermost layer of the core wire. Thereafter, trimming cut is performed on a tip end of the core wire in order to optimize a protruding dimension of the core wire.

As a device that automatically peels a coating at a terminal portion of an electric wire, a coating peeling device including a cutter that moves in an radial direction of the electric wire has been known (see, for example, Patent Literature 1). The coating peeling device sandwiches and cuts the coating in the vicinity of a tip end of the electric wire by using, for example, a pair of cutters, and peels the coating on the tip end side from a cutting position by relatively retracting the cutters with respect to the covered electric wire in the cut state.

Further, in order to optimize a protruding dimension of the core wire after the coating is peeled in this way, the electric wire after coating peeling is set again in a trimming device, and trimming cut is performed on the tip end of the core wire.

CITATION LIST

Patent Literature

[Patent Document 1] JP-A-2017-93283

SUMMARY

Technical Problem

In a case where a peeling process and a trimming cut process are performed by separate devices, a process such as setting of the electric wire is repeated, and the operation cannot be performed in a continuous series of flow, and thus the work efficiency is impaired.

The present invention has been made in view of the above circumstances, and an object thereof is to provide a cable terminal processing apparatus capable of efficiently performing a peeling operation on a coating and a trimming cut operation on a tip end of a core wire after coating peeling in a continuous series of flow in the same apparatus.

Solution to Problem

In order to achieve the above object, the a cable terminal processing apparatus according to the present invention is characterized by the following (1) to (9).

(1) A cable terminal processing apparatus that peels a coating around a core wire in a terminal portion of a cable and performs trimming cut on a tip end of a core wire after coating peeling, the cable terminal processing apparatus comprising:

a rotation shaft that has, at a front end thereof, a rotary head rotatable about a rotation axis;

a rotation drive mechanism that drives the rotary head to rotate;

a cable holding mechanism that holds and fixes, in front of the rotary head, the terminal portion of the cable in a state of being aligned with a rotation axis of the rotation shaft and in a posture in which a tip end thereof is oriented toward a rear side of the rotary head;

a peeling cutter that is mounted on the rotary head so as to be displaceable in a radial direction of the rotary head and causes a blade edge thereof to cut into a coating of the terminal portion of the cable held by the cable holding mechanism by being displaced inward in the radial direction; and a cutting cutter that is mounted on the rotary head so as to be displaceable in the radial direction of the rotary head, is disposed closer to a base end side of the cable than the peeling cutter, and performs trimming cut on the tip end of the core wire after coating peeling by being displaced inward in the radial direction;

a cutter opening and closing mechanism that opens the peeling cutter and the cutting cutter outward in the radial direction and closes the peeling cutter and the cutting cutter inward in the radial direction, in a state where the rotary head is rotating; and an axial direction moving mechanism that has a function of moving the rotary head and the cable holding mechanism relative to each other in an axial direction of the rotation shaft, positions a blade edge of the peeling cutter and the cutting cutter in the axial direction with respect to the cable by moving and stopping, and peels the coating on a tip end side by moving the rotary head and the cable holding mechanism in a direction away from each other in a state where the blade edge of the peeling cutter is cut into the coating of the terminal portion of the cable.

(2) The cable terminal processing apparatus according to (1), wherein the peeling cutter is disposed in a pair at positions facing each other with the rotation axis of the rotary head sandwiched therebetween, the cutting cutter is disposed in a pair at positions between the pair of peeling cutters in a circumferential direction of the rotary head, that is, at positions facing each other with the rotation axis of the rotary head sandwiched therebetween, both of the pair of peeling cutters are configured with a single blade in a posture in which a cutter face thereof is oriented toward a base end side of the cable and a cutter back thereof perpendicular to the rotation axis of the rotary head is oriented toward a tip end side of the cable, and are disposed on a same plane perpendicular to the rotation axis of the rotary head, and the pair of cutting cutters, one being configured with a single blade in a posture in which a cutter face thereof is oriented toward the tip end side of the cable and a cutter back thereof perpendicular to the rotation axis of the rotary head is oriented toward the base end side of the cable, and the other being configured with a single blade in a posture in which the cutter face thereof is oriented toward the base end side of the cable and the cutter back thereof perpendicular to the rotation axis of the rotary head is oriented toward the tip end side of the cable, is disposed on different planes perpendicular to the rotation axis of the rotary head and is disposed such that cutting blades thereof are capable of meshing with each other in a state where the cutter backs of both of the cutting cutters slide against each other.

(3) The cable terminal processing apparatus according to (2), wherein each cutting blade of the peeling cutter and the cutting cutter is formed in a V-groove shape as viewed from a direction of the rotation axis of the rotary head, (4) The cable terminal processing apparatus according to (2), wherein the cutter opening and closing mechanism has a mechanical linked structure of opening the cutting cutter at the time of closing the peeling cutter and closing the cutting cutter at the time of opening the peeling cutter.

(5) The cable terminal processing apparatus according to (4), wherein the rotary head includes a cutter plate on a front side on which cutter holders that hold the peeling cutter and the cutting cutter respectively are slidably mounted in the radial direction of the rotary head, and a cam plate that is disposed on a back side thereof and on whose front surface a cam groove is formed, and a cam follower coupled with each cutter holder is engaged with the cam groove, and the cutter opening and closing mechanism is configured to include the cam plate and the cutter holder, which is coupled with the cam follower so as to be slidable in the radial direction of the rotary head, and when the cam plate is rotated relative to the cutter plate, displaces each cutter inward in the radial direction and outward in the radial direction by cam action of the cam groove and the cam follower.

(6) The cable terminal processing apparatus according to (5), wherein as the cam groove, one spiral-shaped cam groove centered on a rotation axis of the cam plate is formed on the front surface of the cam plate, and all the cam followers are engaged with the spiral-shaped cam groove, and of a pair of cutter holders that hold the peeling cutter and a pair of cutter holders that hold the cutting cutter, one pair of cutter holders is coupled with the cam followers respectively which are disposed on a same side as a cutter to be held with respect to the rotation axis of the rotary head, and the other pair of cutter holders is coupled with the cam followers respectively which are disposed on an opposite side of a cutter to be held with respect to the rotation axis of the rotary head.

(7) The cable terminal processing apparatus according to (5), wherein a cutter plate rotating shaft integrated with the cutter plate and a cam plate rotating shaft integrated with the cam plate, which are provided as rotating shafts of the rotary head, form a double-shaft structure in which both shafts are driven to rotate with the cutter plate rotating shaft being an inner shaft and the cam plate rotating shaft being an outer shaft;

as the rotation drive mechanism, a first rotation drive mechanism that drives the cutter plate rotating shaft to rotate is coupled with the cutter plate rotating shaft, and a second rotation drive mechanism that drives the cam plate rotating shaft to rotate is coupled with the cam plate rotating shaft; and a relative rotation is caused between the cutter plate and the cam plate by independent rotation control of the first and second rotation drive mechanisms.

(8) The cable terminal processing apparatus according to (7), wherein the axial direction of the rotation shaft is set to a horizontal direction, a work unit is provided on a base member so as to be linearly movable along the axial direction of the rotation shaft and the cable holding mechanism is fixedly disposed in front of the work unit, whereby the axial direction moving mechanism is configured as a mechanism that linearly moves the work unit, and the rotation shaft, the rotation drive mechanism, and the cutter opening and closing mechanism are mounted on the work unit.

(9) The cable terminal processing apparatus according to (7), wherein a suction mechanism that is passed through a hollow portion of the cutter plate rotating shaft provided as the inner shaft of the double-shaft structure, and sucks and removes a peeling waste of the coating by the cutter, According to the cable terminal processing apparatus having the configuration of (1), both the peeling cutter and the cutting cutter are mounted on one rotary head. Therefore, while the cutter is rotated on an outer peripheral side of the cable, the peeling operation on the coating and the trimming cut operation on the tip end of the core wire after coating peeling can be efficiently performed in a continuous flow in the same apparatus. Further, the cutting cutter disposed by shifting a position thereof closer to the base end side of the cable than the peeling cutter, and thus by determining a position shift amount in advance, the trimming cut can be performed on the tip end of the core wire at a coating peeling completion position by closing the cutting cutter without performing position adjustment in the axial direction. Therefore, it is possible to omit an extra process of adjusting the position for the trimming cut, which can contribute to improvement of efficiency. Further, since the peeling cutter and the cutting cutter are separately provided, the cutters having the cutting blades effective for the peeling operation and the trimming cut operation can be used, and operation efficiency and operation quality can be improved. In particular, electric wires including coaxial cables are becoming thinner year by year, and the difficulty in processing the terminals is increased for that reason alone. Therefore, by allocating roles to the two types of cutters in accordance with operation content, it is possible to improve the operation efficiency and the operation quality and also reduce wear of the cutting blade.

According to the cable terminal processing apparatus having the configuration of (2), since the peeling operation can be performed using the pair of peeling cutters facing each other with the rotation axis sandwiched therebetween, it is possible to perform a stable peeling operation with high accuracy. Similarly, since the trimming cut operation is performed using the pair of cutting cutters facing each other with the rotation axis L sandwiched therebetween, it is possible to perform a stable trimming cut operation with high accuracy.

In the peeling cutter, the cutter back perpendicular to the rotation axis is oriented toward the tip end of the cable, and thus when movement in the axial direction for peeling is performed with the blade edge of the cutting blade cut in the coating, catching of the blade edge with respect to the coating is stabilized and the blade edge is less likely to be detached from the coating. In other words, the inclined surface (blade surface) of the cutter face does not come into contact with the coating and the surface (cutter back) perpendicular to the axis comes into contact with a cut end surface of the coating, and thus even when a pull-out force is applied for peeling, the blade edge can be reliably caught with respect to the coating without the cutter back running over the coating. Therefore, it is possible to stably and reliably perform the peeling. Further, since the cutting cutters are meshing blades whose cutter backs slide against each other like scissors, the trimming cut can be performed on the tip end of the core wire to have a clean cross section.

According to the cable terminal processing apparatus having the configuration of (3), the cutting blade of the peeling cutter and the cutting blade of the cutting cutter are formed in a V-groove shape as viewed from the direction of the rotation axis of the rotary head. Therefore, when the blade edge of the cutting blades hits the outer periphery of the cylindrical coating or the outer periphery of the core wire, the blade edge can be reliably cut into the coating or the core wire without escaping from the blade edge, and a stable operation can be performed.

Further, at the time of peeling the coating, a pair of V-shaped cutting blades can apply the pull-out force for peeling to the coating while rotating, in a state where four sides of the pair of V-shaped cutting blades are cut into the coating, and thus the peeling can be stably performed with good balance without having the blade edge escaping from the coating.

According to the cable terminal processing apparatus having the configuration of (4), since the peeling cutter and the cutting cutter are mechanically linked such that one closes when the other opens, the safety can be enhanced without the risk of abnormal operation.

According to the cable terminal processing apparatus having the configuration of (5), with the action of the cam groove and the cam follower, it is possible to open and close the peeling cutter and the cutting cutter in a linked manner only by rotating the cam plate relative to the cutter plate.

According to the cable terminal processing apparatus having the configuration of (6), it is possible to close the cutting cutter at the time of opening the peeling cutter and open the cutting cutter at the time of closing the peeling cutter 1, while employing a simple configuration in which all the cam followers are engaged with one spiral-shaped cam groove. Therefore, the structure can be simplified.

According to the cable terminal processing apparatus having the configuration of (7), when the cutter plate and the cam plate are synchronously rotated by the rotation control of the first and second rotation drive mechanisms, the peeling cutter and the cutting cutter can be held at a neutral position in an opening and closing direction. Further, when the cutter plate and the cam plate are relatively rotated to one side by the rotation control of the first and second rotation drive mechanisms, it is possible to close the cutting cutter while opening the peeling cutter. When the cutter plate and the cam plate are relatively rotated to the other side, it is possible to open the cutting cutter while closing the peeling cutter. In other words, since an opening and closing position and an opening and closing speed of the two sets of cutters are determined by the relative rotation position and relative rotation speed between the cutter plate and the cam plate, the opening and closing accuracy can be easily improved. The opening and closing speed of the peeling cutter and the cutting cutter can be changed by a method of setting a path length of the spiral-shaped cam groove. Therefore, in particular, a degree of advance of the blade edge at the time of closing the peeling cutter can be controlled with high accuracy.

According to the cable terminal processing apparatus having the configuration of (8), by advancing and retracting the work unit, it is possible to position the peeling cutter and the cutting cutter in the axial direction with respect to the cable and perform peeling of the coating.

According to the cable terminal processing apparatus having the configuration of (9), by actuating the suction mechanism before the coating is completely peeled off in the peeling process of the coating, it is possible to suck the peeled coating waste from the front end of the rotation shaft toward a rear end and remove the peeled coating waste to the outside, through the hollow portion of the suction pipe.

As described, the peeling waste is sucked and removed through the hollow portion of the rotation shaft, and thus a suction path can be secured without being disturbed by the rotation shaft. Therefore, even in the terminal processing apparatus including a rotary working head, it is possible to perform suction and removal of the peeling waste with a simple structure.

Advantageous Effects of Invention

According to the invention, the peeling operation on the coating and the trimming cut operation on the tip end of the core wire after coating peeling can be performed efficiently in a continuous series of flow in the same apparatus.

The invention has been briefly described above. Further, details of the invention will be clarified by reading a mode for carrying out the invention (hereinafter, referred to as "embodiment") described below with reference to the accompanying drawings.

BRIEF DESCRIPTION OF THE DRAWINGS

FIGS. 13A to 13C are diagrams for illustrating a relationship between the cam plate and the cam follower, in which FIG. 13A is a perspective view illustrating a configuration of a spiral-shaped cam groove on a front surface of the cam plate, and FIGS. 13B and 13C are front views for illustrating movement in a radial direction of the cam follower at the time when the cam plate rotates relative to the cutter plate respectively in a direction indicated by an arrow RA (rightward in the front view) and in a direction indicated by an arrow RB (leftward in the front view).

FIGS. 16A and 16B are diagrams illustrating a relationship between the slide piece and the cam follower, in which FIG. 16A is a perspective view thereof as seen from a back side, and FIG. 16B is a perspective view thereof as seen from a front side.

FIGS. 17A and 17B are diagrams illustrating an attachment state of a cutter holder of the peeling cutter with respect to the cam follower and to the slide piece, in which FIG. 17A is a perspective view illustrating a state before the attachment as viewed from the front, and FIG. 17B is a perspective view illustrating a state after the attachment as viewed from the front.

FIGS. 18A and 18B are schematic diagrams for illustrating an opening and closing operation of the peeling cutter at the time when the cam follower is displaced outward or inward in the radial direction by relative rotation of the cam plate with respect to the cutter plate, in which FIG. 18A is a front view illustrating that the peeling cutter moves in a closing direction as the cam follower is displaced outward in the radial direction, and FIG. 18B is a front view illustrating that the peeling cutter moves in an opening direction as the cam follower is displaced inward in the radial direction.

FIGS. 19A and 19B are diagrams illustrating a positional relationship between the peeling cutter and the cutting cutter and orientation of blade surfaces thereof, in which FIG. 19A is a perspective view as viewed from a front (front surface) side, and FIG. 19B is a perspective view as viewed from a back (rear surface) side.

FIGS. 21A and 21B are diagrams illustrating details of the cutters, in which FIG. 21A is a perspective view illustrating the peeling cutters that are taken out, and FIG. 21B is a perspective view illustrating the cutting cutters that are taken out.

DETAILED DESCRIPTION OF EMBODIMENTS

Specific embodiments of the invention will be described below with reference to the drawings.

Figure 24A:
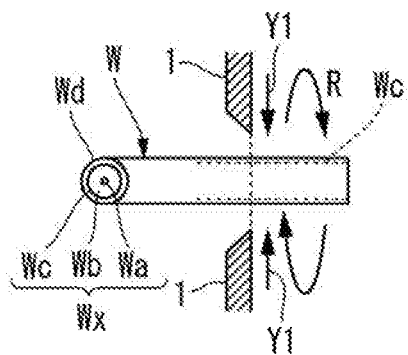
FIGS. 24A to 24J are diagrams illustrating a flow of a series of processing from coating peeling to trimming cut of a coaxial cable.

In the following description of the embodiments, a cable to be subjected to terminal processing operation is a coaxial electric wire. As illustrated in FIG. 24A, a coaxial electric wire W (hereinafter, also referred to as a cable W) is a cable having a concentric layer structure including a center conductor (inner conductor) Wa, an inner coat (dielectric) Wb covering an outer periphery of the enter conductor Wa, a braid (outer conductor) Wc covering an outer periphery of the inner coat Wb, and an outer coat (coating) Wd covering an outer periphery of the braid Wc. In this specification, an inner electric wire portion including the braid Wc, the inner coat Wb, and the center conductor Wa, excluding the outer coat Wd, is referred to as a "core wire Wx".

<Overall Configuration>

Figure 1:
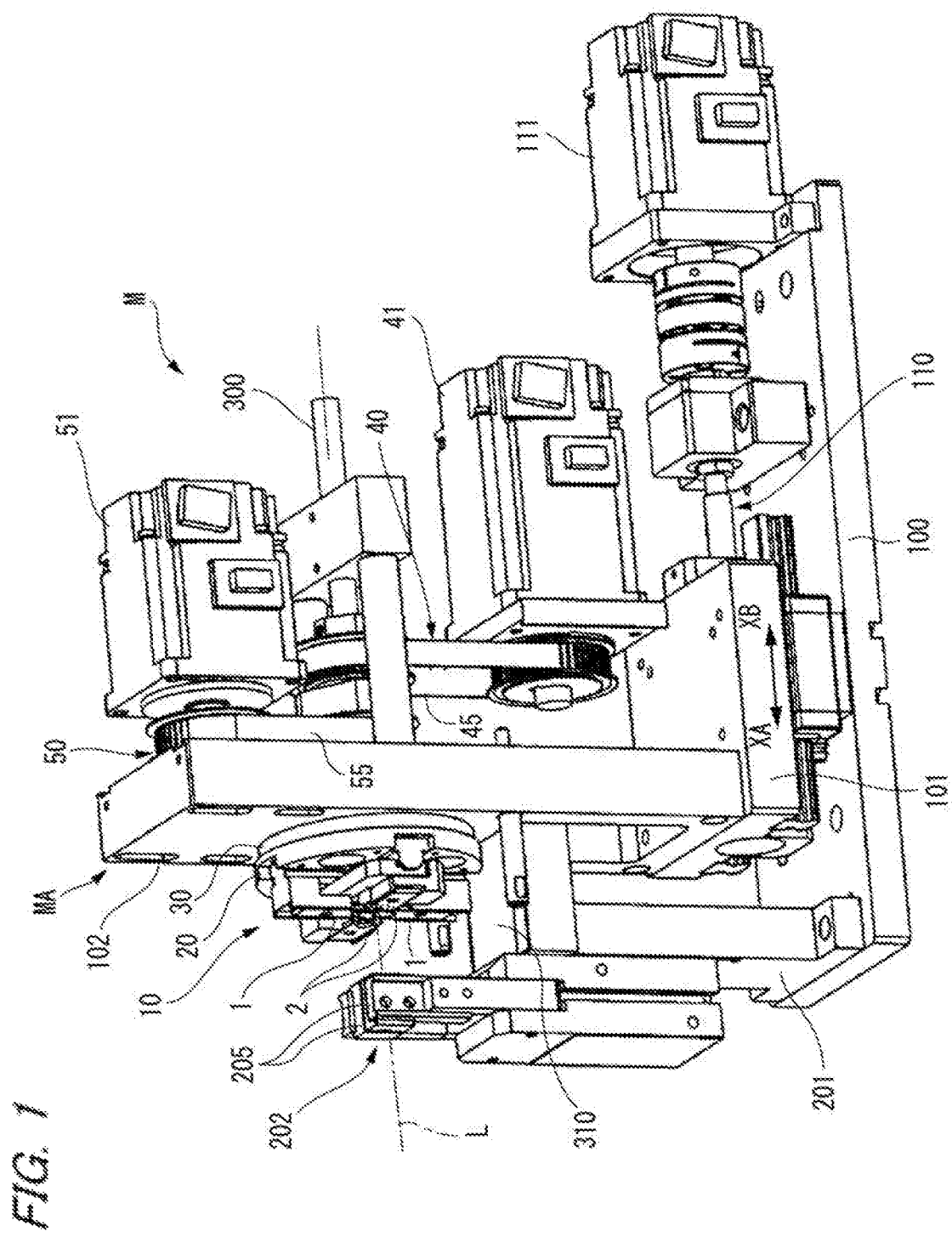
FIG. 1 is a perspective view illustrating an external appearance of an overall configuration of a cable terminal processing apparatus with a cover thereof removed according to an embodiment of the invention.
Figure 2:
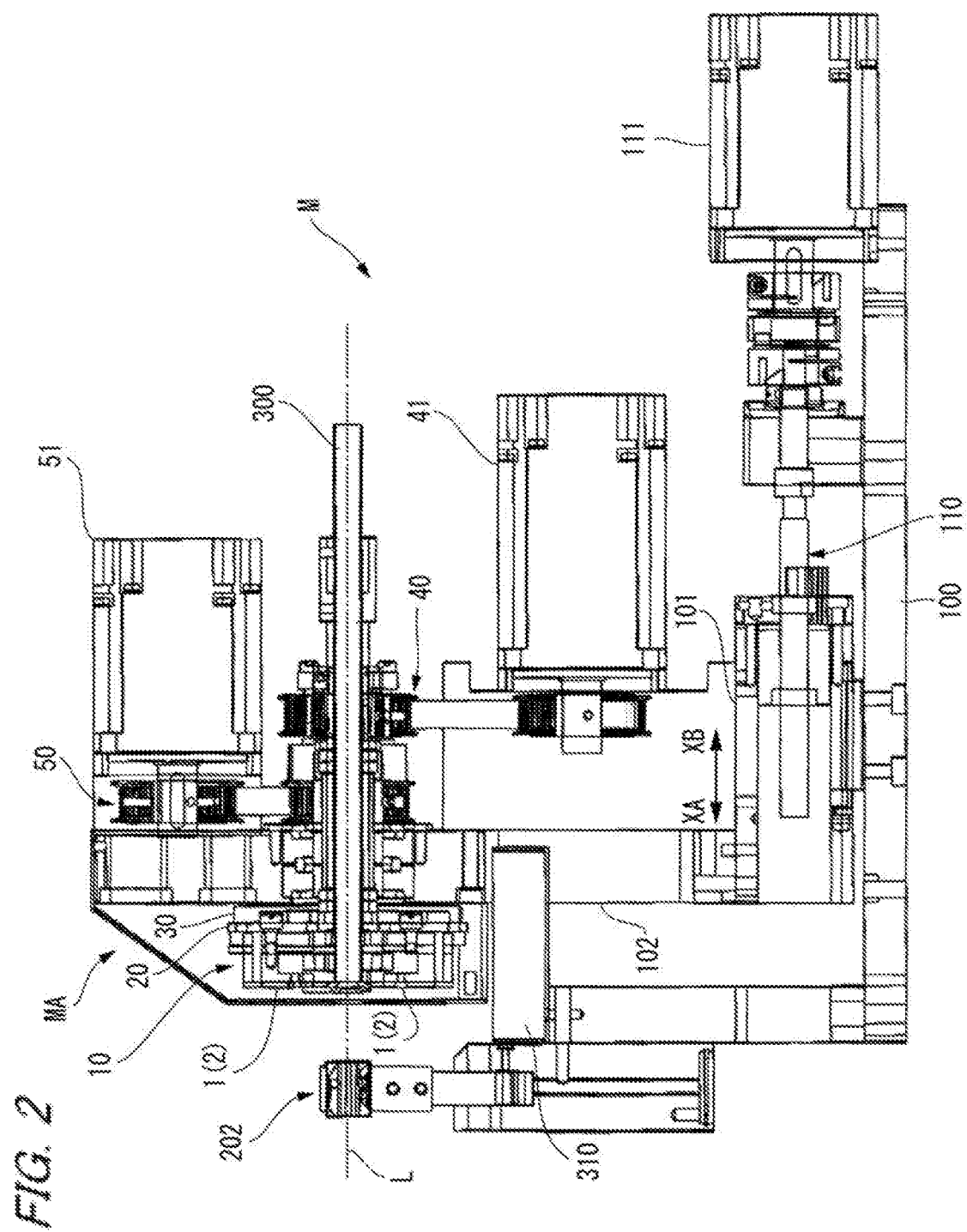
FIG. 2 is a side sectional view illustrating the overall configuration.
Figure 3:
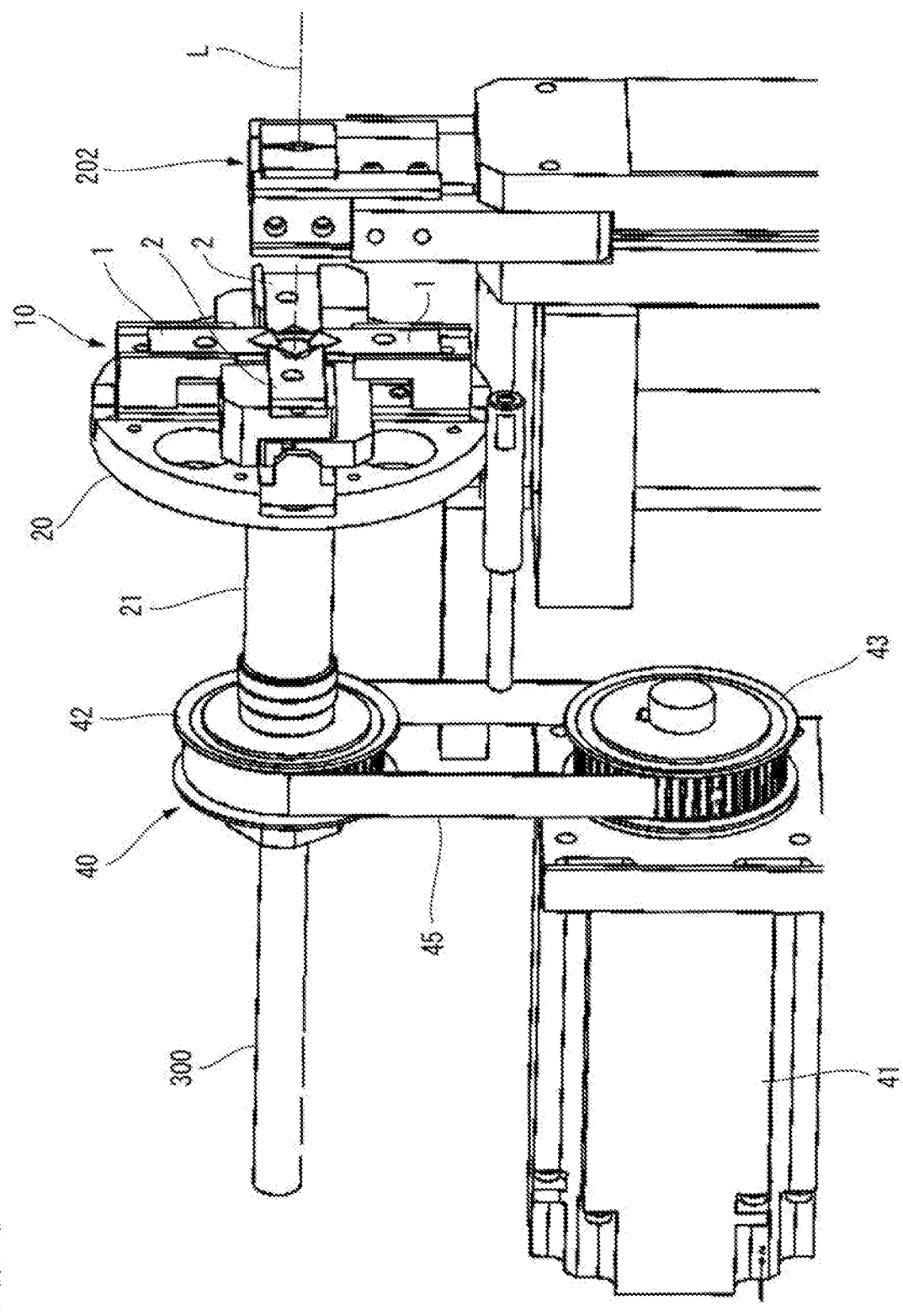
FIG. 3 is a perspective view illustrating a rotation drive system of a cutter plate in a rotary head which is a main part of the apparatus.
Figure 4:
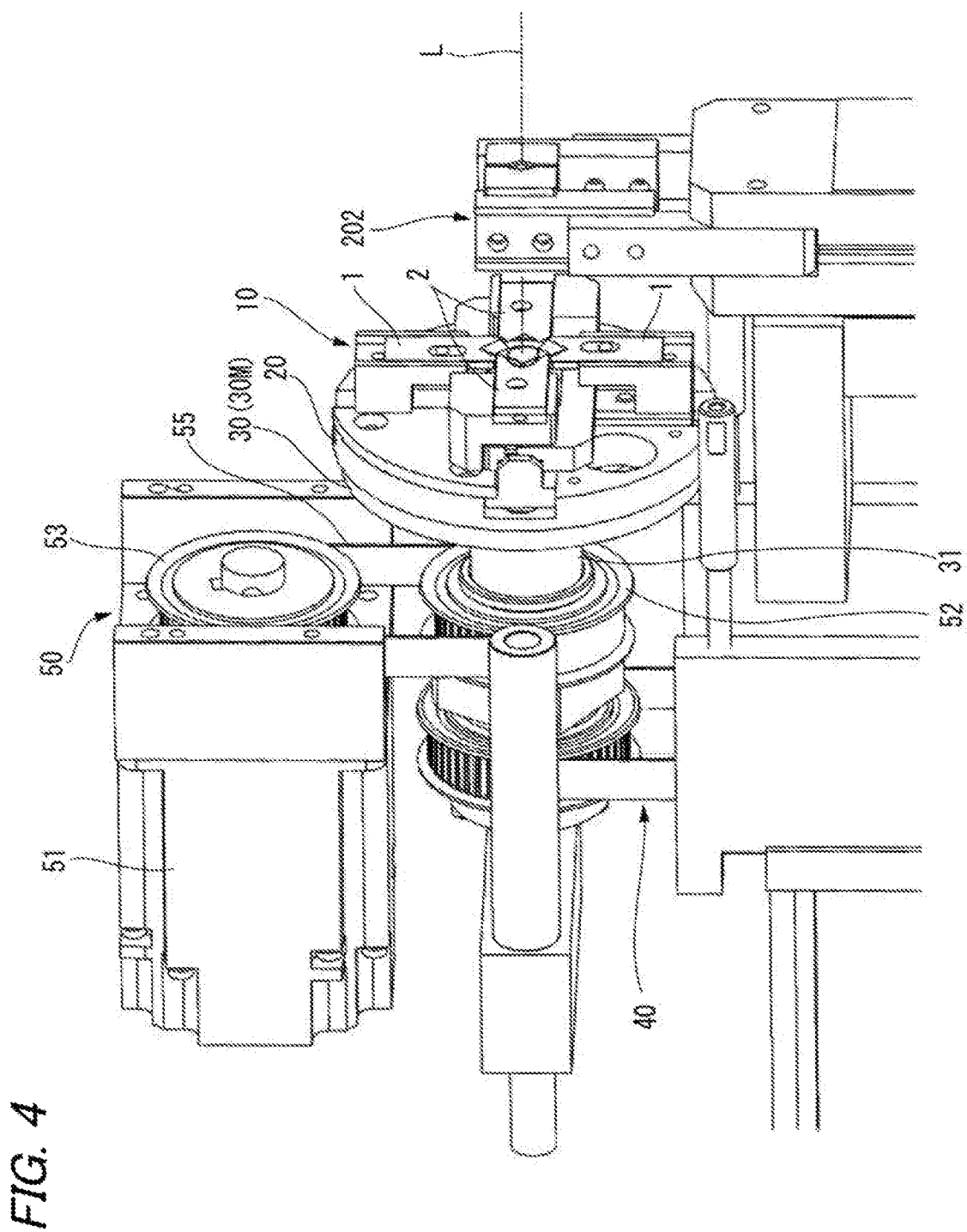
FIG. 4 is a perspective view illustrating a rotation drive system, which is taken out, of a cam plate that is a main element of a cutter opening and closing mechanism.
Figure 5:
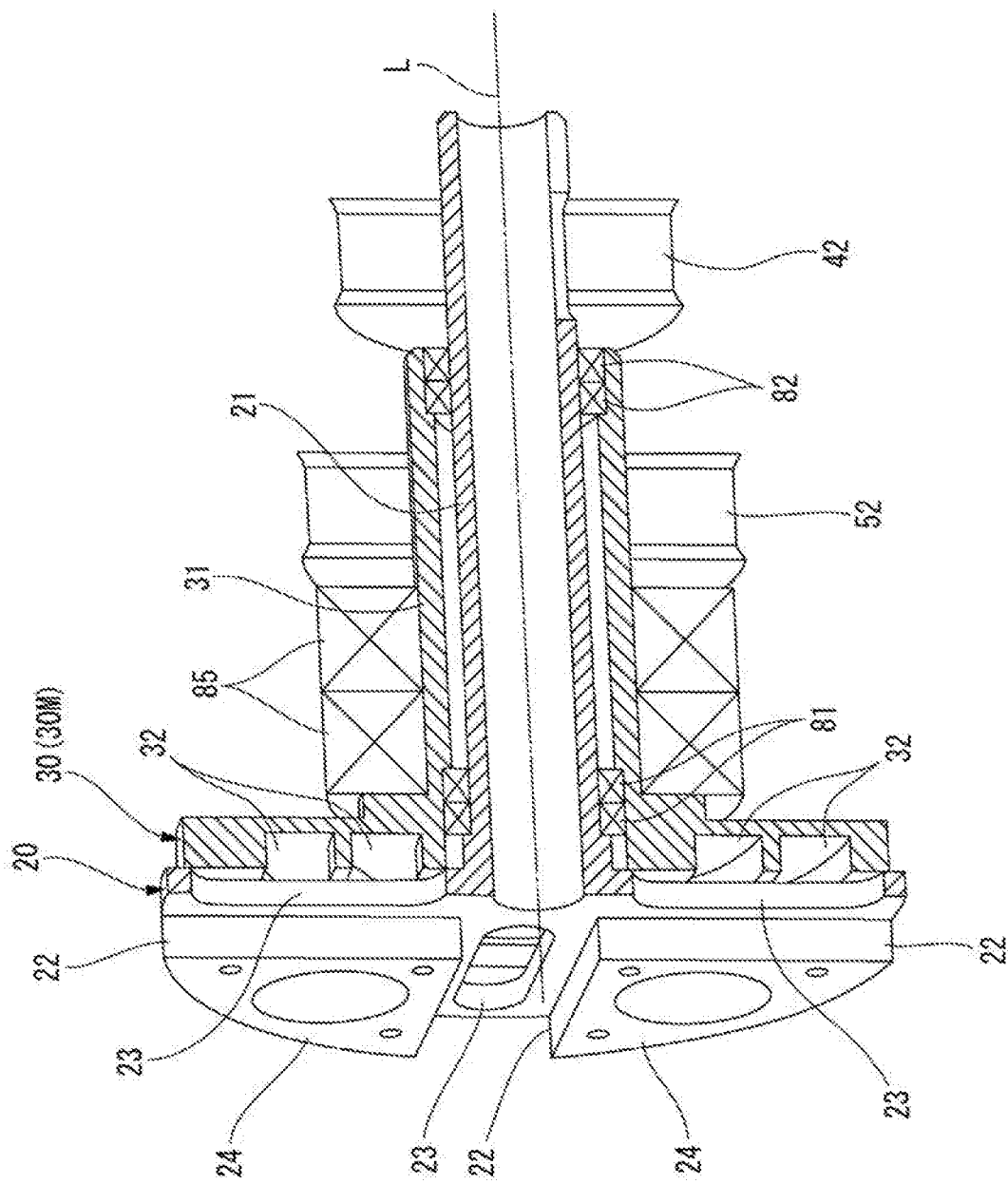
FIG. 5 is a perspective sectional view illustrating a rotation support structure of the rotary head which is taken out.
Figure 6:
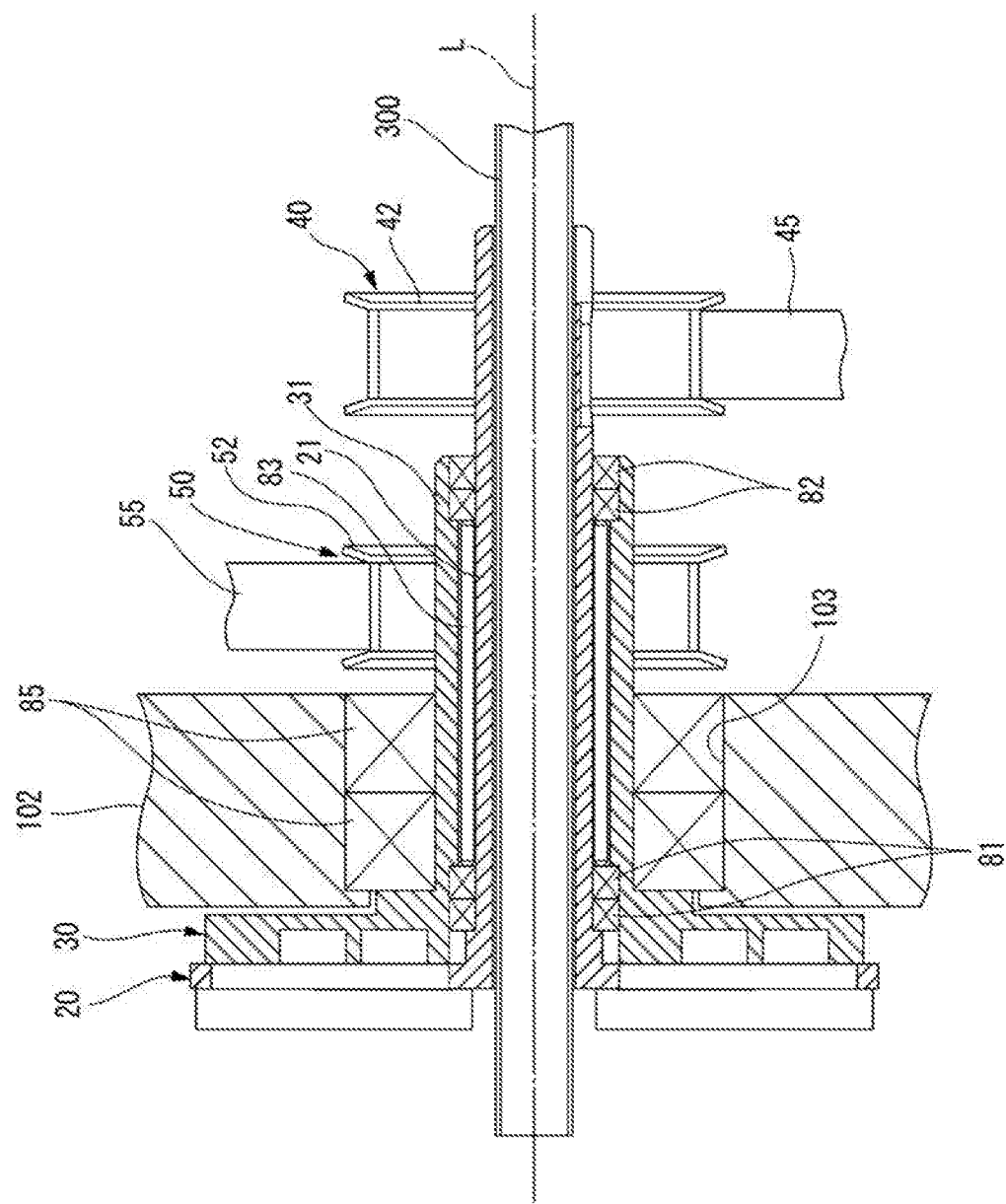
FIG. 6 is a sectional view illustrating the rotation support structure and the rotation drive system of the rotary head which are taken out.

FIG. 1 is a perspective view illustrating an external appearance of an overall configuration of a cable terminal processing apparatus with a cover thereof removed according to the present embodiment. FIG. 2 is a side sectional view illustrating the overall configuration. FIGS. 3 and 4 are perspective views illustrating a rotation drive system of a rotary head that is a main part of the apparatus in which FIG. 3 is a perspective view illustrating a rotation drive system of a cutter plate, and FIG. 4 is a perspective view illustrating a rotation drive system, which is taken out, of a cam plate that is a main element of a cutter opening and closing mechanism. Further, FIG. 5 is a perspective sectional view illustrating a rotation support structure of the rotary head which is taken out, and FIG. 6 is a sectional view illustrating the rotation support structure and the rotation drive system of the rotary head which are taken out.

A terminal processing apparatus M illustrated in FIGS. 1 and 2 performs, in a series of flow, a coating peeling process (see FIGS. 24A to 24E) of stripping a predetermined length of the outer coat Wd from a tip end of a terminal portion of the coaxial electric wire W (see FIG. 24A), and a process (see FIGS. 24G to 24J) of performing trimming cut on a tip end of the core wire Wx after the coating peeling.

As illustrated in FIGS. 1 and 2, the terminal processing apparatus M includes, on a base plate 100, a work unit MA that is linearly movable in directions indicated by arrows XA and XB opposite to each other in a horizontal direction. Here, the direction indicated by the arrow XA in the drawing is referred to as a front direction, and the direction indicated by the arrow XB in the drawing is referred to as a rear direction. Therefore, advancement of the work unit MA means movement in the direction indicated by the arrow XA, and retraction of the work unit MA means movement in the direction indicated by the arrow XB.

The work unit MA includes a slide plate 101 that is provided on the base plate (base member) 100 so as to be slidable linearly via a guide mechanism, and a vertical plate 102 that is erected at a front end of the slide plate 101. A work unit linear moving mechanism 110 of a ball screw type that advances and retracts the work unit MA is provided between the base plate 100 and the slide plate 101. The work unit linear moving mechanism 110 operates by driving of a servo motor 111.

The work unit MA is set with a horizontal rotation axis L that coincides with an axis of a terminal portion of a cable, which is an operation target and is held in a fixed position. A linear sliding direction of the work unit MA is set to a direction parallel to the rotation axis L. In the work unit MA, a rotary head 10 is provided on a front side of the vertical plate 102. The rotary head 10 is provided so as to be driven to rotate about the rotation axis line L.

<Cable Holding Mechanism>

A cable holding mechanism 202 is disposed via a bracket 201 erected at a front end of the base plate 100, in front of the work unit MA. The cable holding mechanism 202 holds and fixes a terminal portion of a cable of an operation target that is transported there by a transport mechanism (not illustrated). The cable holding mechanism 202 closes a pair of left and right grip members 205 that open and close in a left-right direction, thereby holding the terminal portion of the cable in a fixed position in a state of being aligned with the rotation axis L of the rotary head 10 for the operation.

In the present embodiment, the cable holding mechanism 202 is fixed, and the work unit MA is advanced and retracted (approaching and getting away) with respect to the cable holding mechanism 202. Therefore, the work unit linear moving mechanism 110 that advances and retracts the work unit MA is equivalent to an axial direction moving mechanism.

The work unit linear moving mechanism 110 positions the work unit MA by moving the work unit MA in a front-rear direction (directions indicated by the arrows XA and XB), and also achieves a function of stripping the coating Wd of the cable W at the time of retracting the work unit MA. That is, as will be described below, in a state where a blade edge of a peeling cutter 1 is cut into the coating Wd of the cable W, the coating Wd on a tip end side is peeled off from a position where the blade edge is cut by retracting the rotary head 10 in a direction away from the cable W.

<Rotary Head>

As illustrated in FIGS. 3 to 6, the peeling cutter 1 and a cutting cutter 2 are mounted on the rotary head 10 so as to be displaceable in a radial direction of the rotary head 10. The peeling cutter 1 is disposed in a pair at positions facing each other with the rotation axis L of the rotary head 10 sandwiched therebetween. The cutting cutter 2 is disposed in a pair at positions between the pair of peeling cutters 1 in a circumferential direction of the rotary head 10, that is, at positions facing each other with the rotation axis L of the rotary head 10 sandwiched therebetween. That is, in the present embodiment, the peeling cutters 1 and the cutting cutters 2 are arranged at intervals of 90 degrees in the circumferential direction, and the pair of peeling cutters 1 and the pair of cutting cutters 2 are at positions facing each other at 180 degrees respectively. The paired cutters 1 and 2 are provided such that positions of blade edges thereof are similar in the radial direction when the cutters 1 and 2 are displaced in the radial direction.

The peeling cutter 1 is displaced inward in the radial direction to have the blade edge thereof cut into a coating of a terminal portion of a cable held by the cable holding mechanism 202. Further, the cutting cutter 2 is disposed closer to a base end side of the cable than the peeling cutter 1, and performs trimming cut on a tip end of the core wire Wx after coating peeling. The rotary head 10 is driven to rotate so that these cutters 1 and 2 rotate around the cable.

The rotary head 10 includes a cutter plate 20 on a front side and a cam plate 30 disposed on a back side of the cutter plate 20. On the cutter plate 20, a cutter holder 11 that holds the peeling cutter 1 and a cutter holder 12 that holds the cutting cutter 2 are mounted so as to be slidable only in the radial direction of the rotary head 10.

The cutter plate 20 is a main component of the rotary head 10, and the cam plate 30 disposed on a back surface of the cutter plate 20 is a main component of a cutter opening and closing mechanism 30M that, in a state where the rotary head 10 is rotating, opens the peeling cutter 1 and the cutting cutter 2 outwardly in the radial direction and closes the peeling cutter 1 and the cutting cutter 2 inwardly in the radial direction in accordance with operation processes. On a front surface of the cam plate 30, one spiral-shaped cam groove 32 is formed as a mechanical element for opening and closing the cutters 1 and 2.

As illustrated in FIGS. 5 and 6, the cutter plate 20 and the cam plate 30, which constitute the rotary head 10, are disposed at front ends of a cutter plate rotating shaft 21 and a cam plate rotating shaft 31 respectively, which are cylindrical shafts. That is, the cutter plate rotating shaft 21 integrally extends rearward from a center of the disk-shaped cutter plate 20. The cam plate rotating shaft 31 integrally extends rearward from a center of the disk-shaped cam plate 30. The cylindrical cutter plate rotating shaft 21 and cam plate rotating shaft 31 provided as rotating shafts of the rotary head 10 form a double-shaft structure, in which both shafts are driven to rotate with the cutter plate rotating shaft 21 being an inner shaft and the cam plate rotating shaft 31 being an outer shaft.

Specifically, the cam plate rotating shaft 31 passes through a shaft supporting hole 103 of the vertical plate 102, and is rotatably supported by a bearing 85 mounted in the shaft supporting hole 103. The cutter plate rotating shaft 21 is inserted into an inner hollow portion of the cam plate rotating shaft 31, and is rotatably supported by bearings 81 and 82 mounted on an inner periphery of the cam plate rotating shaft 31. Therefore, the cutter plate rotating shaft 21 and the cutter plate 20, and the cam plate rotating shaft 31 and the cam plate 30 are supported by the vertical plate 102 so as to be freely rotatable independently of each other. A cylindrical spacer 83 for securing an interval between the bearings 81 and 82 is disposed between the bearing 81 on a front side and the rear bearing 82 on a rear side which support the cutter plate rotating shaft 21.

Rotation drive mechanisms 40 and 50 independent of each other are coupled with the cutter plate rotating shaft 21 and the cam plate rotating shaft 31 respectively. That is, a first rotation drive mechanism 40 that drives the cutter plate rotating shaft 21 to rotate is coupled with the cutter plate rotating shaft 21. A second rotation drive mechanism 50 that drives the cam plate rotating shaft 31 to rotate is coupled with the cam plate rotating shaft 31. Further, it is possible for a relative rotation between the cutter plate 20 and the cam plate 30 to occur by independent rotation control of the first and second rotation drive mechanisms 40 and 50.

As illustrated in FIG. 3, the first rotation drive mechanism 40 includes a drive motor 41, a drive pulley 43 fixed to a motor shaft, a driven pulley 42 fixed to the cutter plate rotating shaft 21, and a timing belt 45 wound between the pulleys 43 and 42. Father, as illustrated in FIG. 4, the second rotation drive mechanism 50 includes a drive motor 51, a drive pulley 53 fixed to a motor shaft, a driven pulley 52 fixed to the cam plate rotating shaft 31, and a timing belt 55 wound between the pulleys 53 and 52.

The cutter opening and closing mechanism 30M of the present embodiment has a mechanical linked structure of opening the cutting cutter 2 at the time of closing the peeling cutter 1 and closing the cutting cutter 2 at the time of opening the peeling cutter 1. Hereinafter, when the cutter 1 or 2 is displaced inward in the radial direction, it means that the pair of cutters 1 or the pair of cutters 2 is closed. When the cutter 1 or 2 is displaced outward in the radial direction, it means that the pair of cutters 1 or the pair of cutters 2 is opened. When the pair of cutters 1 and the pair of cutters 2 are opened and closed, the blade edges of the cutters 1 facing each other at 180 degrees synchronize in symmetry about the rotation axis L, and the blade edges of the cutters 2 facing each other at 180 degrees synchronize in symmetry about the rotation axis L. Further, by closing the pair of peeling cutters 1, the blade edges of the peeling cutters 1 can be cut into the coating of the cable. Further, by closing the pair of cutting cutters 2, the blade edges of the cutting cutters 2 can be intersected to cut the core wire.

On the work unit MA, the rotation shafts (the cutter plate rotating shaft 21 and the cam plate rotating shaft 31) having the rotary head 10 (the cutter plate 20 and the cam plate 30) at the front ends thereof, the first and second rotation drive mechanisms 40 and 50, and the cutter opening and closing mechanism 30M are mounted. The cutter opening and closing mechanism 30M takes the cam plate 30 as a main component, and includes a cam follower 17 to be described below and the second rotation drive mechanism 50.

<Detailed Description of Rotary Head and Cutter Attachment Structure>

Next, a configuration of the rotary head 10 will be described in detail.

Figure 7:
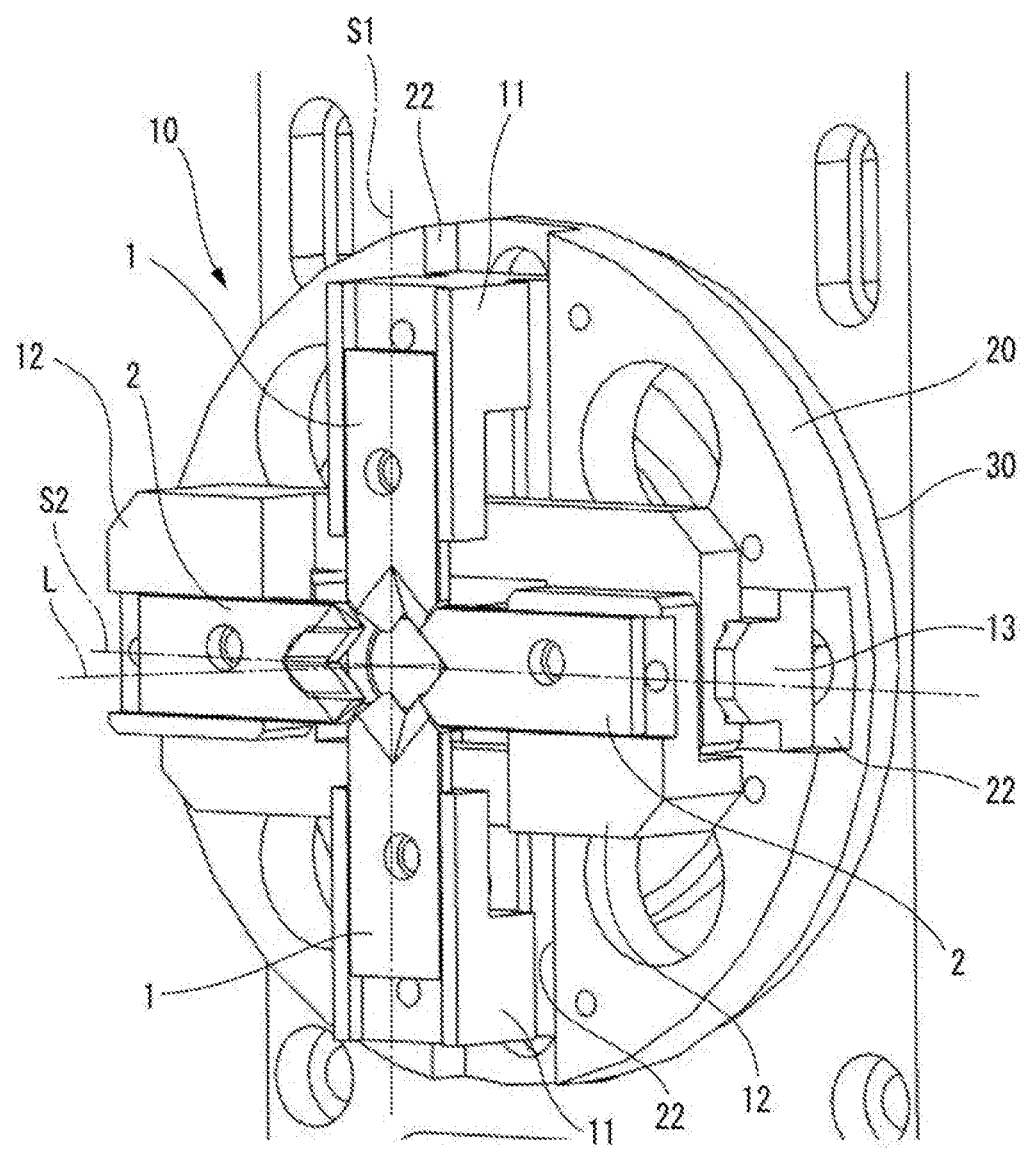
FIG. 7 is a perspective view illustrating a configuration of a cutter part attached to a front surface of the rotary head.
Figure 8:
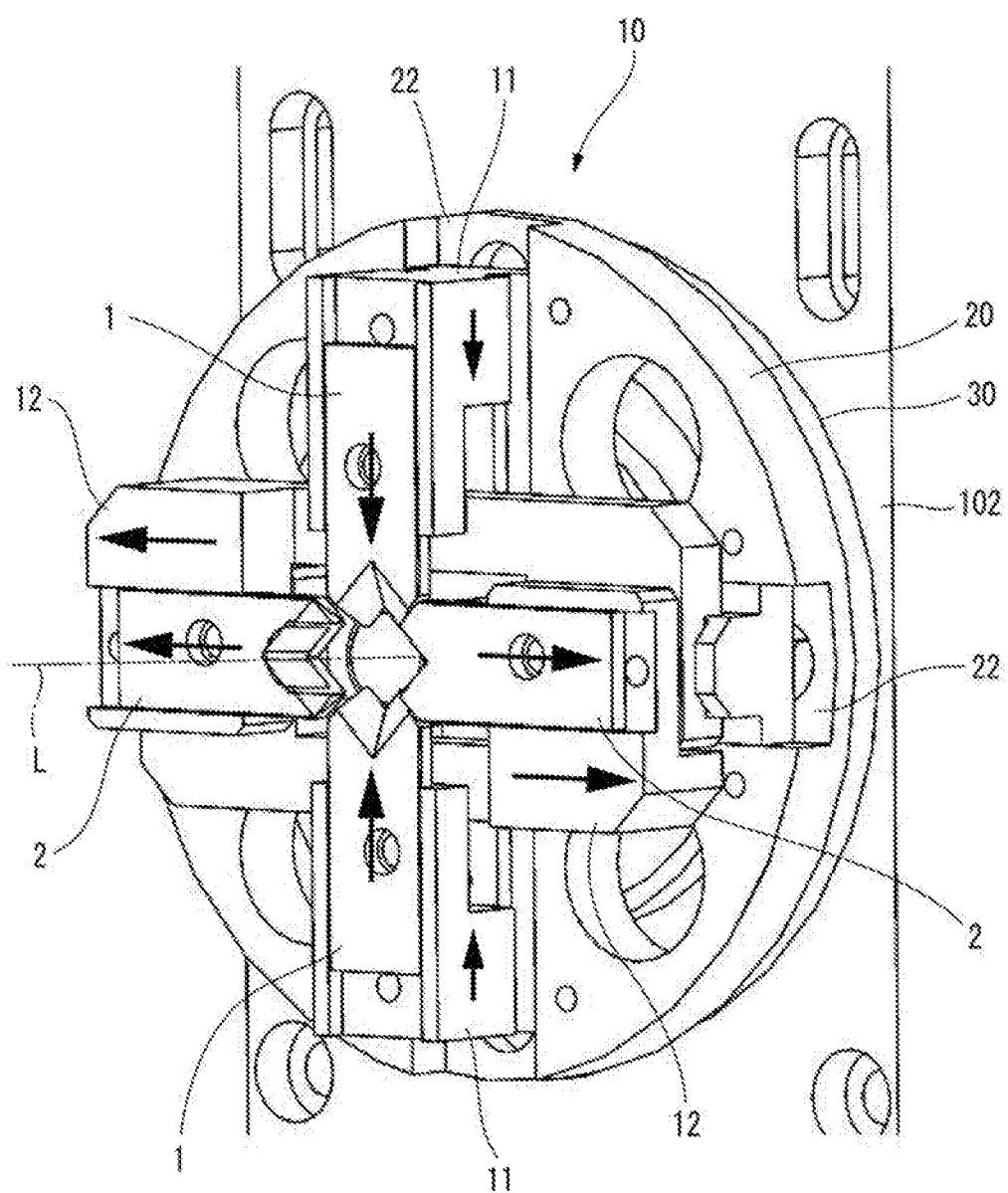
FIG. 8 is a perspective view for illustrating linked movement at the time when a peeling cutter is closed and a cutting cutter is opened.
Figure 9:
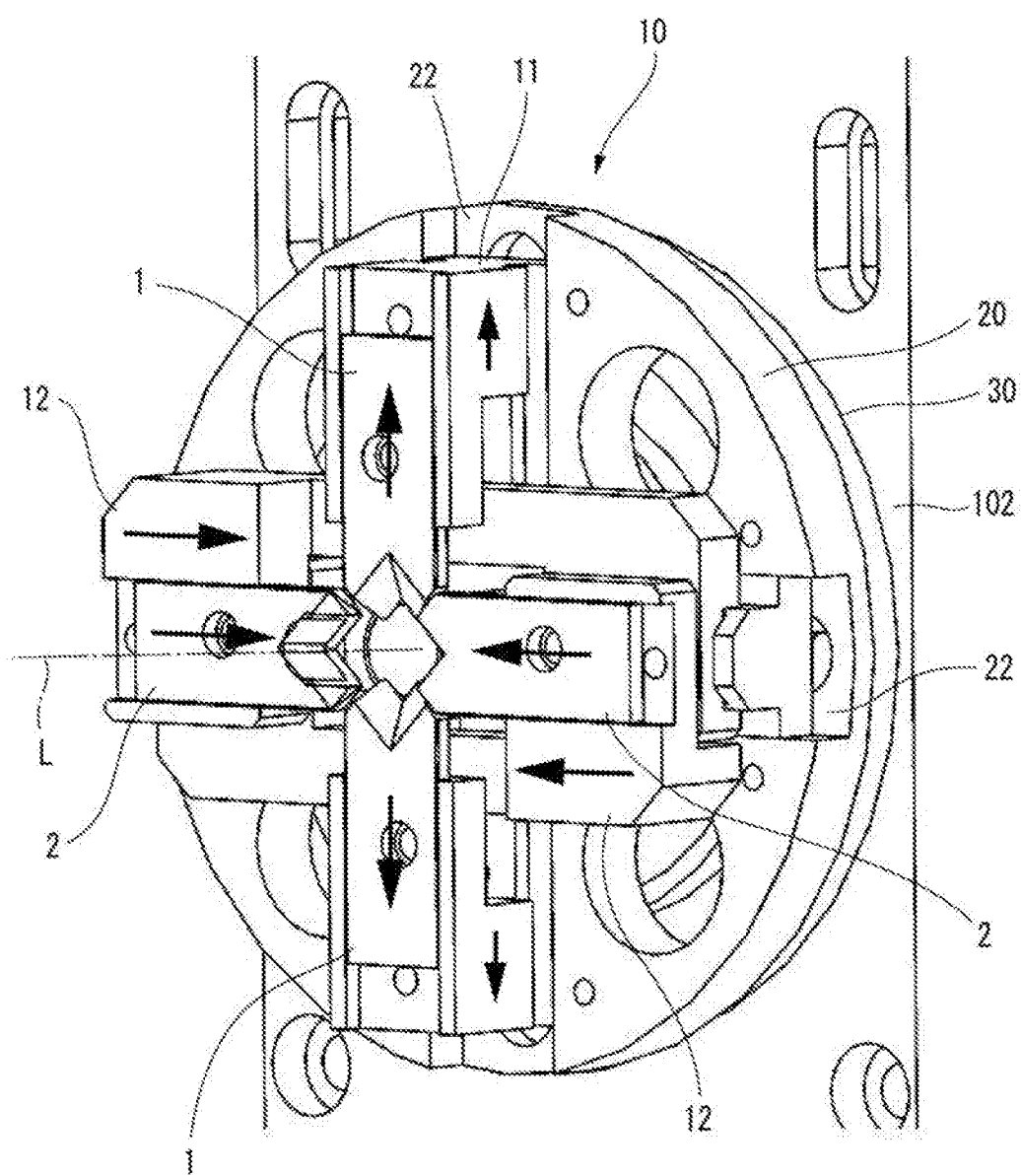
FIG. 9 is a perspective view for illustrating linked movement at the time when the peeling cutter is opened and the cutting cutter is closed.

FIG. 7 is a perspective view illustrating a configuration of a cutter part attached to a front surface of the rotary head. FIG. 8 is a perspective view for illustrating linked movement at the time when the peeling cutter is closed and the cutting cutter is opened. FIG. 9 is a perspective view for illustrating linked movement at the time when the peeling cutter is opened and the cutting cutter is closed.

Figure 10:
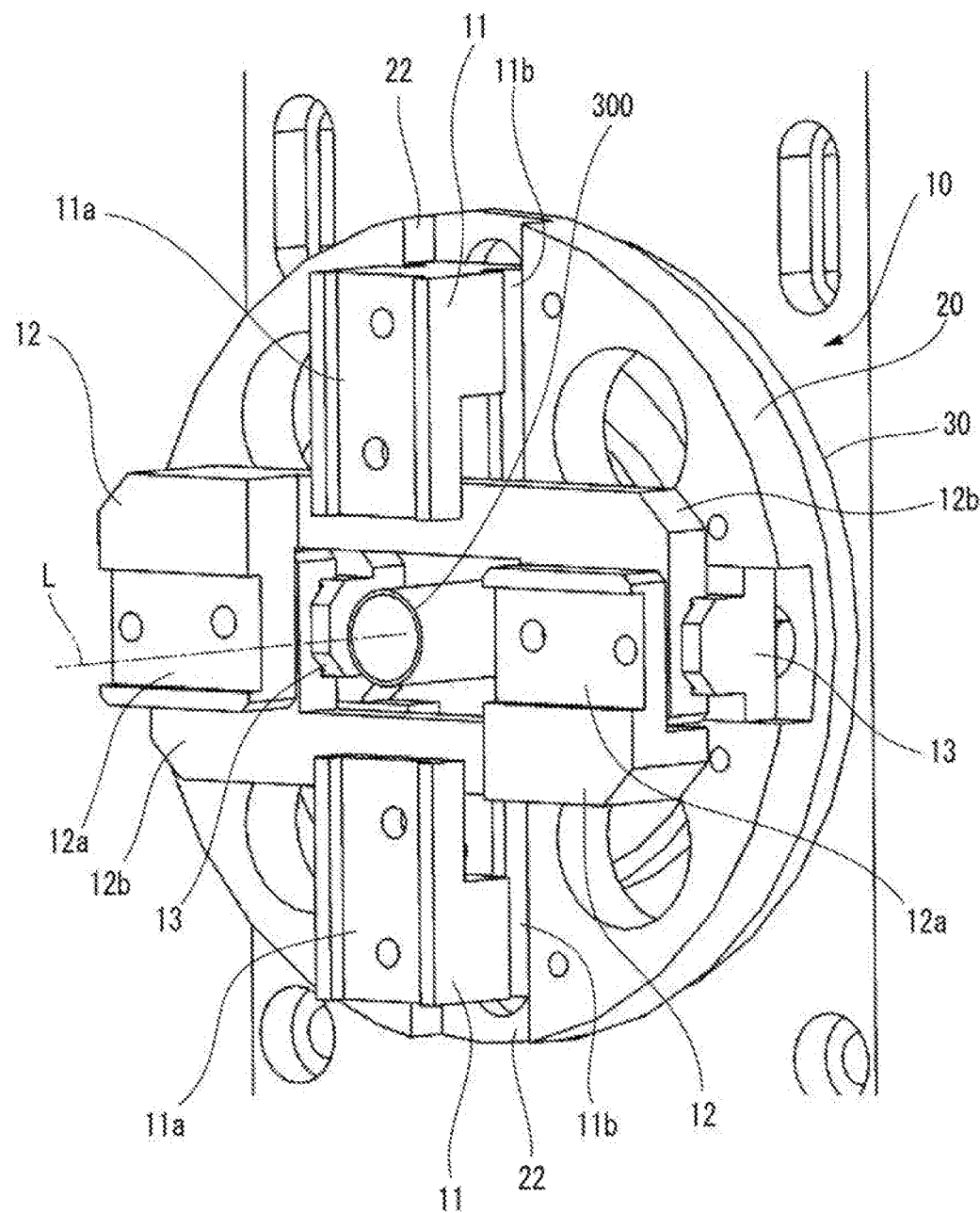
FIG. 10 is a perspective view illustrating the rotary head in a state where a cutter holder is visible by removing the cutters.
Figure 11:
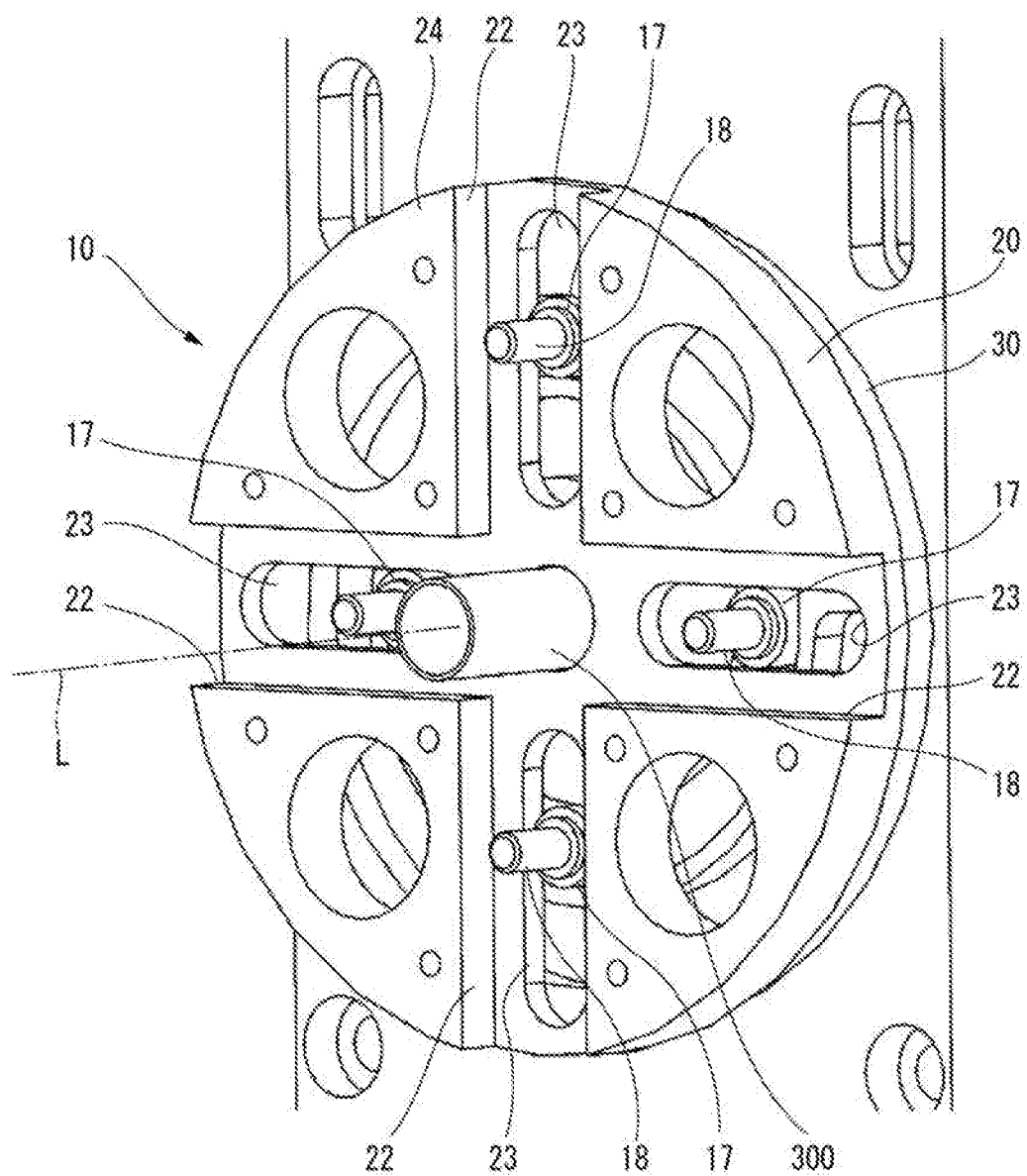
FIG. 11 is a perspective view illustrating the rotary head in a state where a cam follower is visible by removing the cutter holder.
Figure 12:
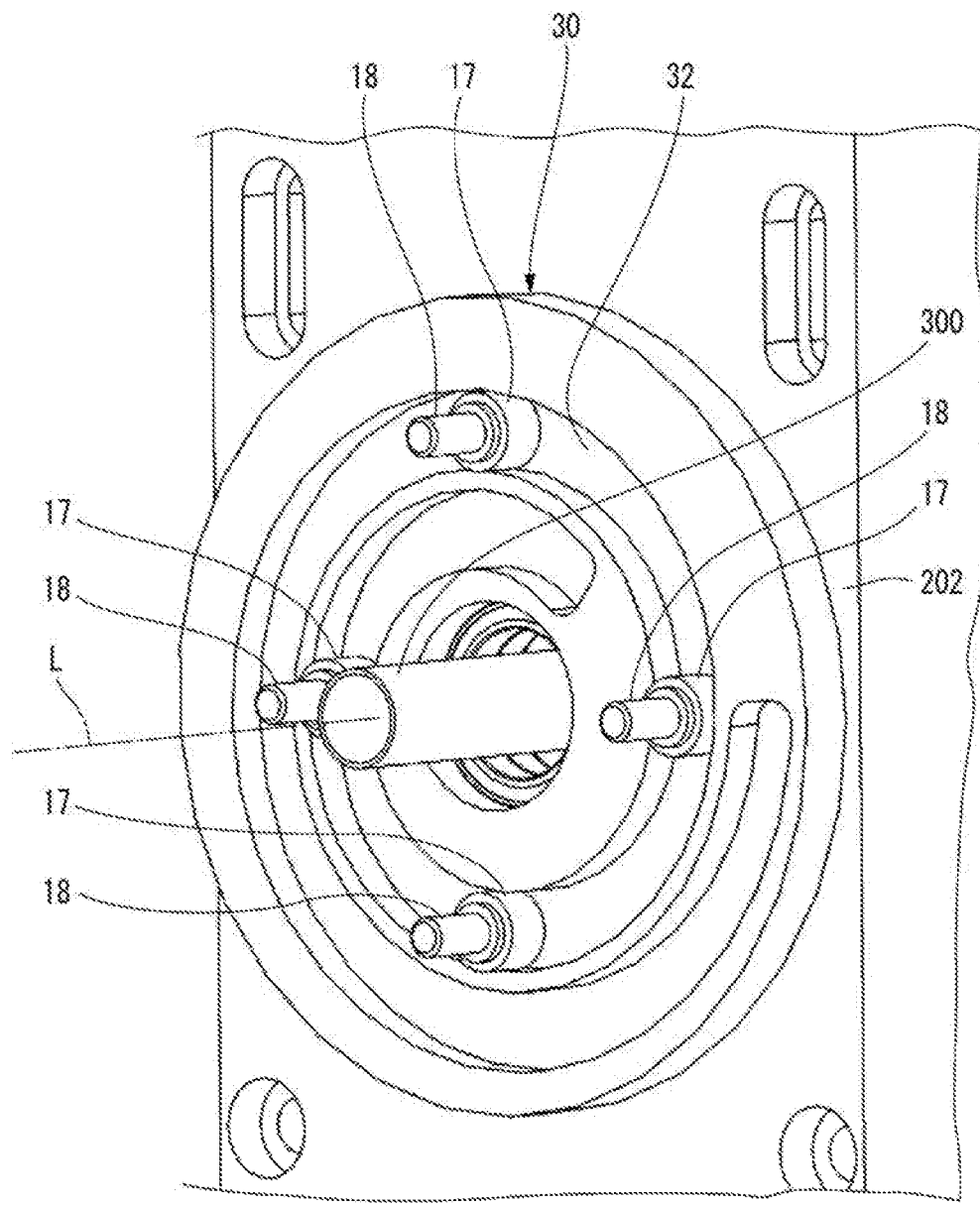
FIG. 12 is a perspective view illustrating a state where the cam plate and the cam follower are visible by removing the cutter plate.
Figure 13A:
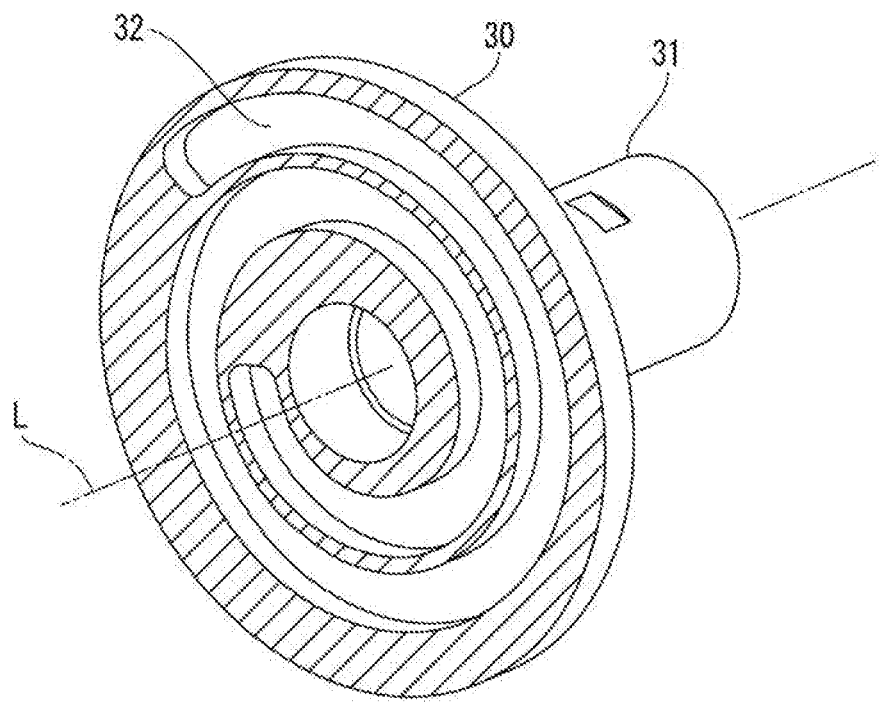
Figures 13B, 13C:
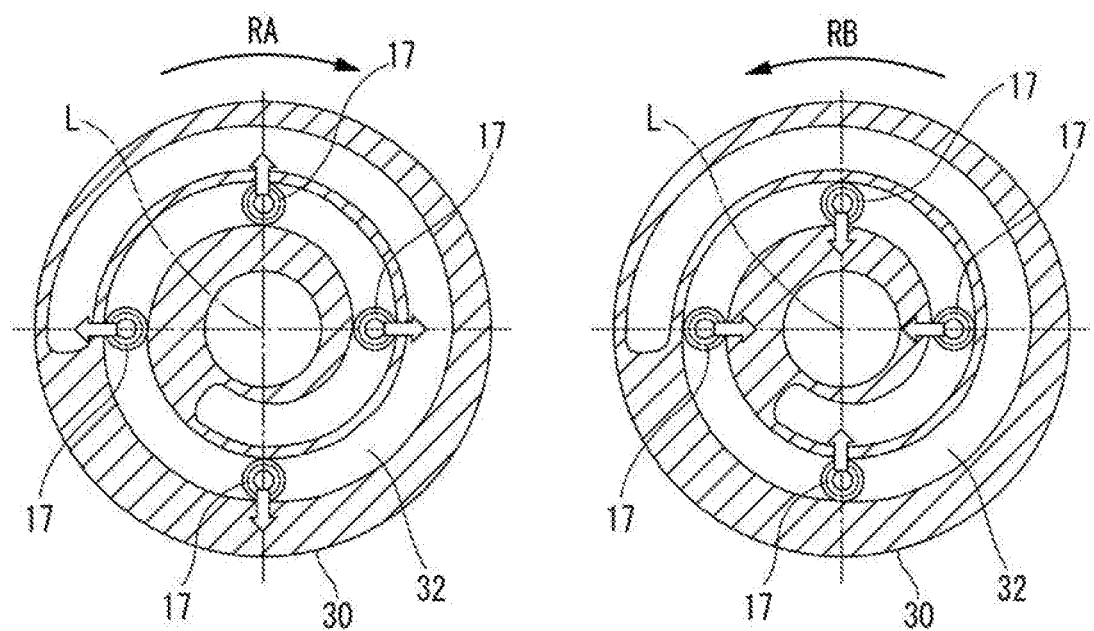
Figure 14:
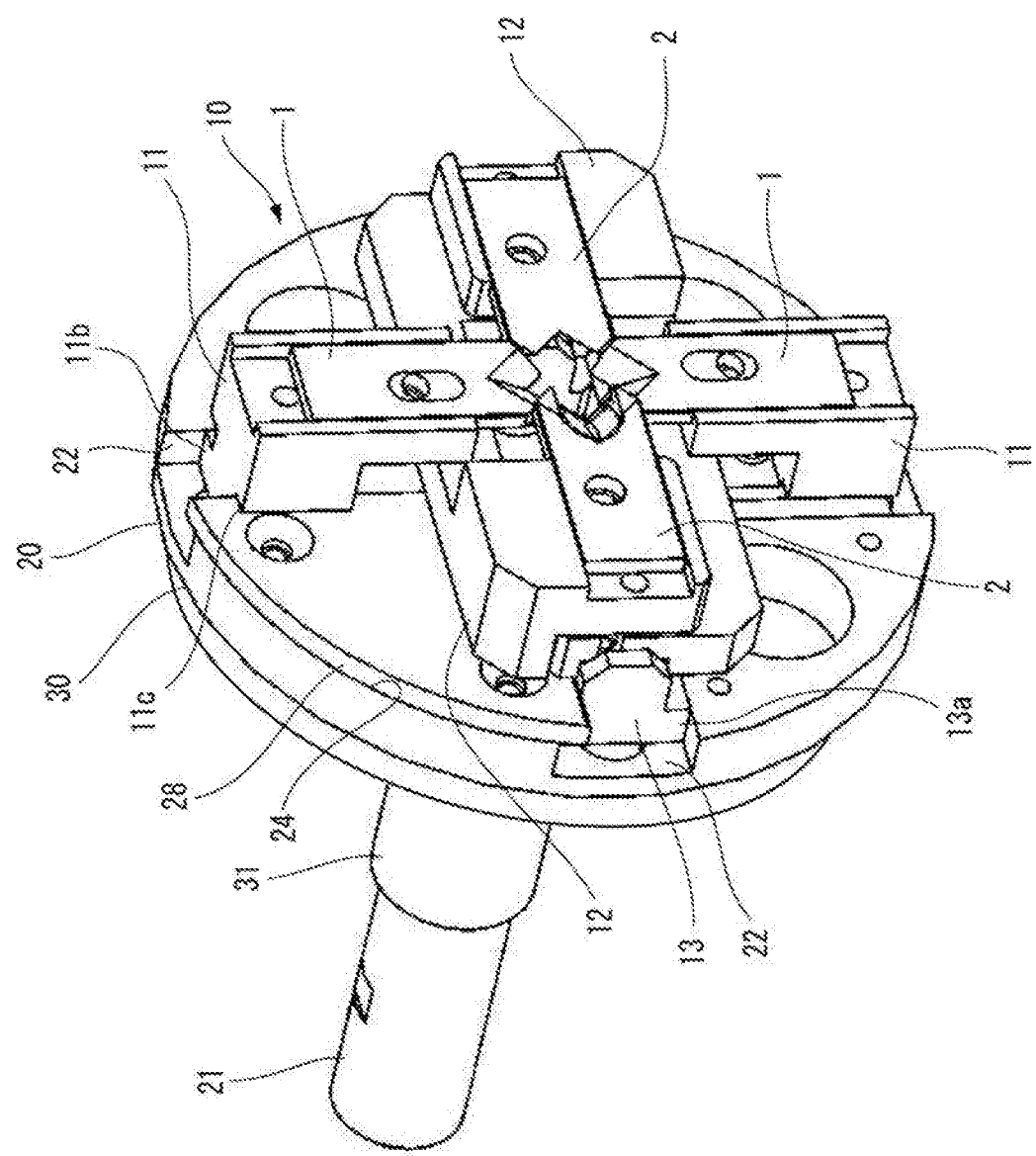
FIG. 14 is a perspective view illustrating an attachment state of a falling restriction plate by which the cutter holder or a slide piece is slidably fixed to the rotary head without failing.

FIG. 10 is a perspective view illustrating the rotary head in a state where the cutter holder is visible by removing the cutter. FIG. 11 is a perspective view illustrating the rotary head in a state where the cam follower is visible by removing the cutter holder. FIG. 12 is a perspective view illustrating a state where the cam plate and the cam follower are visible by removing the cutter plate. FIGS. 13A to 13C are diagrams for illustrating a relationship between the cam plate and the cam follower, in which FIG. 13A is a perspective view illustrating a configuration of a spiral-shaped cam groove on a front surface of the cam plate, and FIGS. 13B and 13C are front views for illustrating movement in a radial direction of the cam follower at the time when the cam plate rotates relative to the cutter plate respectively in a direction indicated by an arrow RA (rightward in the front view) and in a direction indicated by an arrow RB (leftward in the front view). FIG. 14 is a perspective view illustrating an attachment state of a falling restriction plate by which the cutter holder or a slide piece is slidably fixed to the rotary head so as not to fall.

Figure 15:
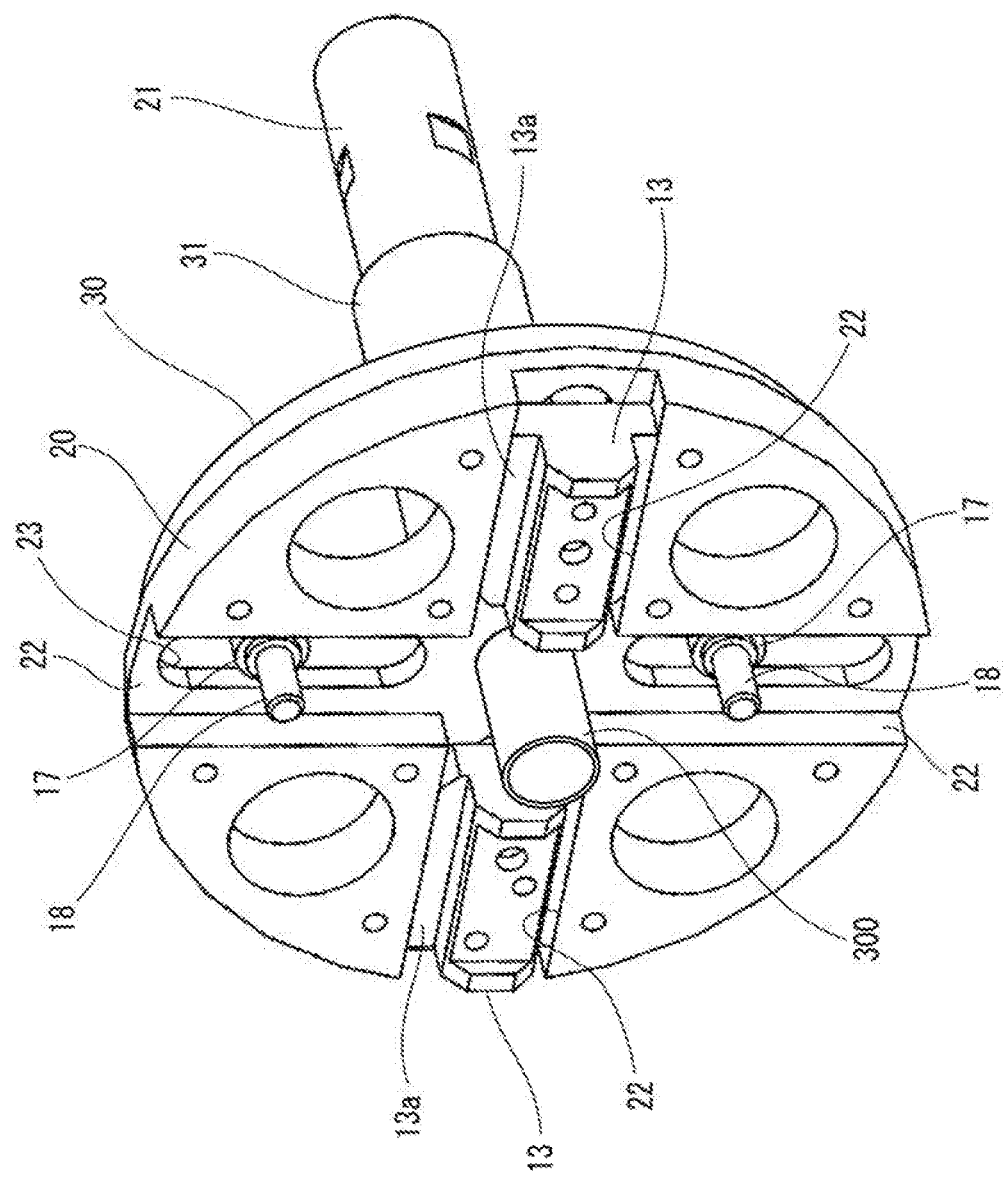
FIG. 15 is a perspective view illustrating an attachment state of the slide piece under the cutting cutter.
Figure 16A:
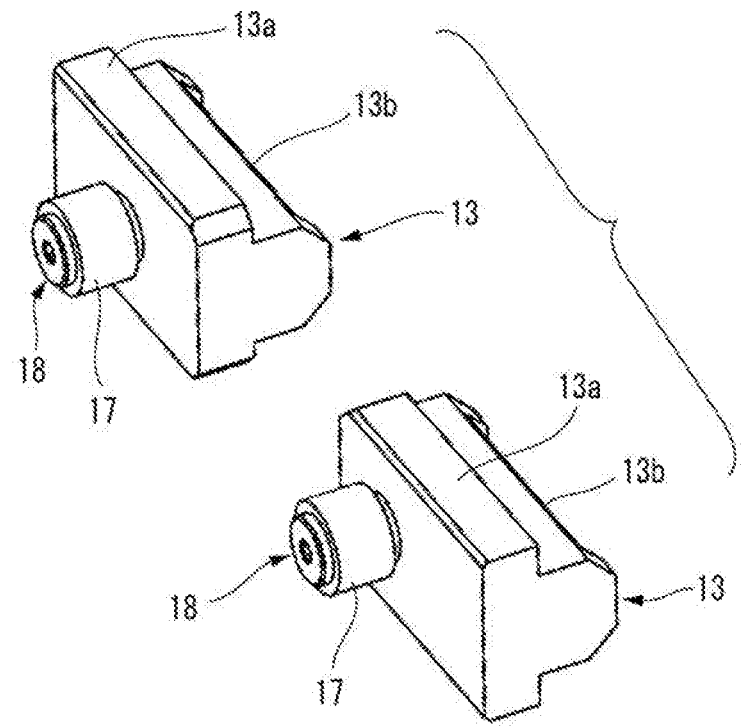
Figure 16B:
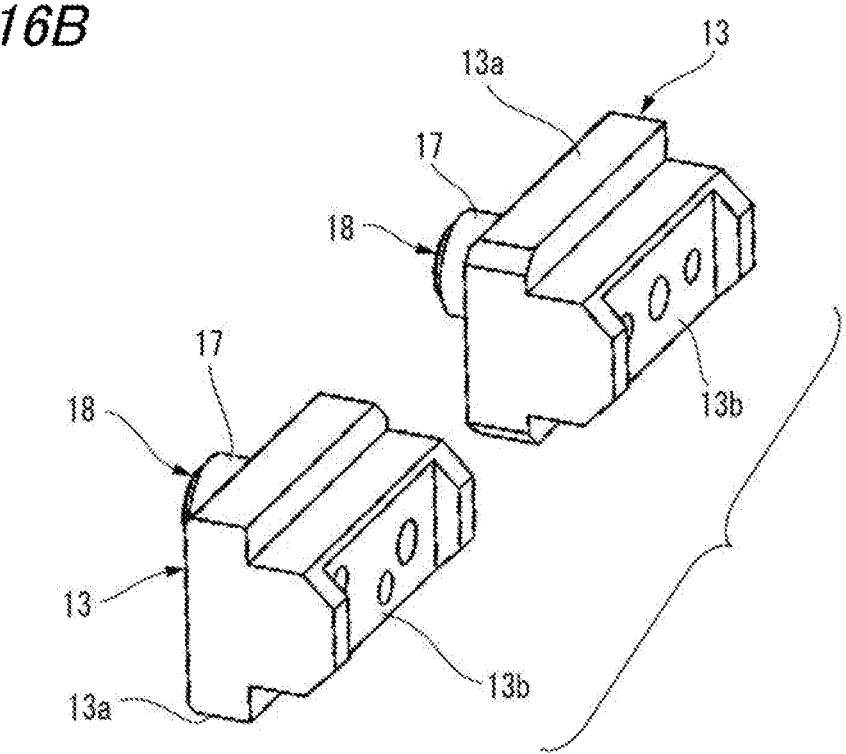

FIG. 15 is a perspective view illustrating an attachment state of the slide piece under the cutting cutter. FIGS. 16A and 16B are diagrams illustrating a relationship between the slide piece and the cam follower, in which FIG. 16A is a perspective view thereof as seen from a back side, and FIG. 16B is a perspective view thereof as seen from a front side.

Figure 17A:
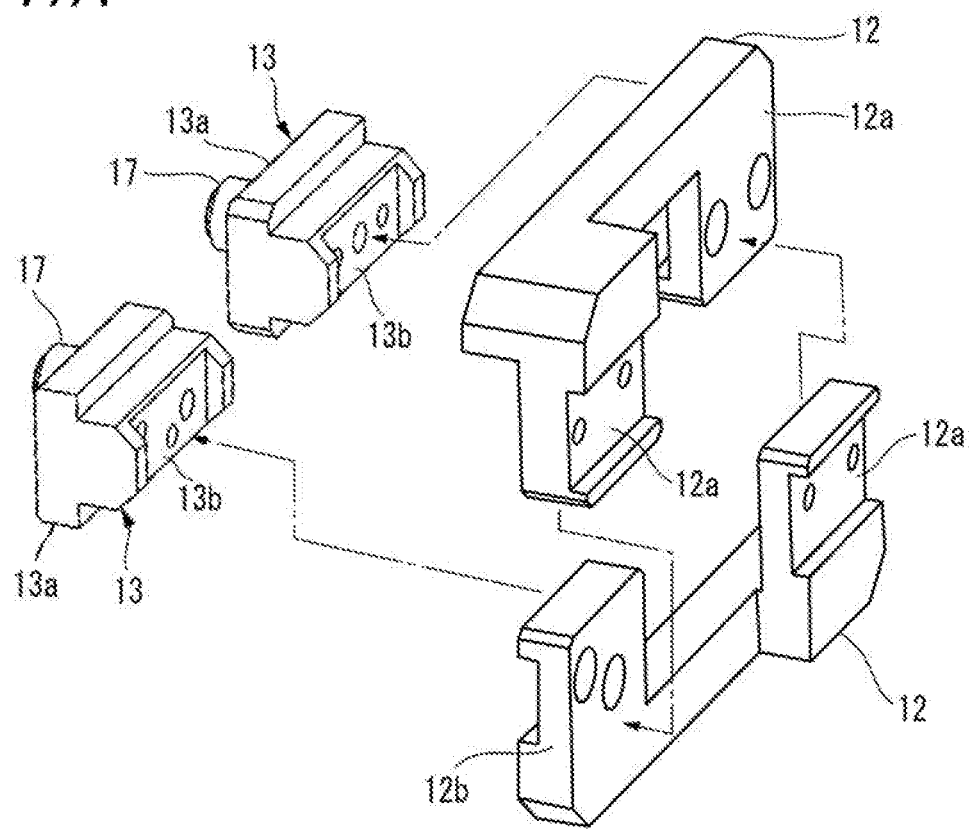
Figure 17B:
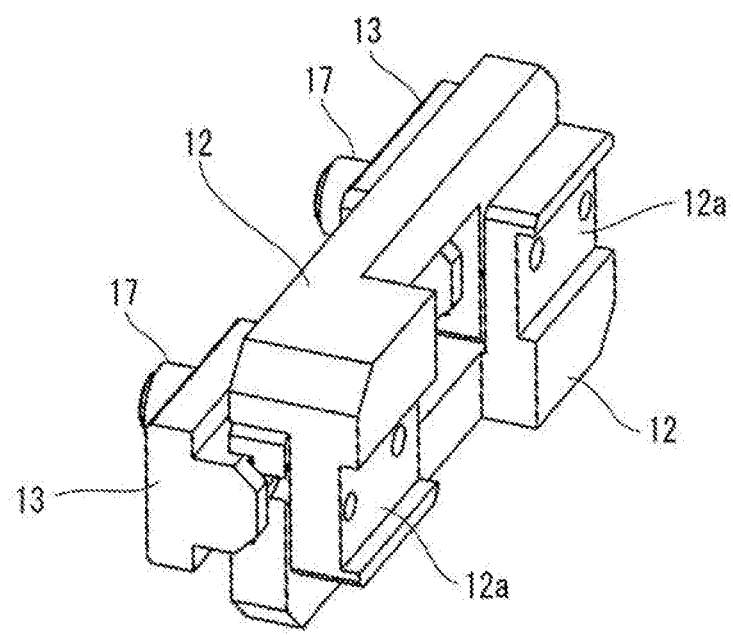
Figure 18A:
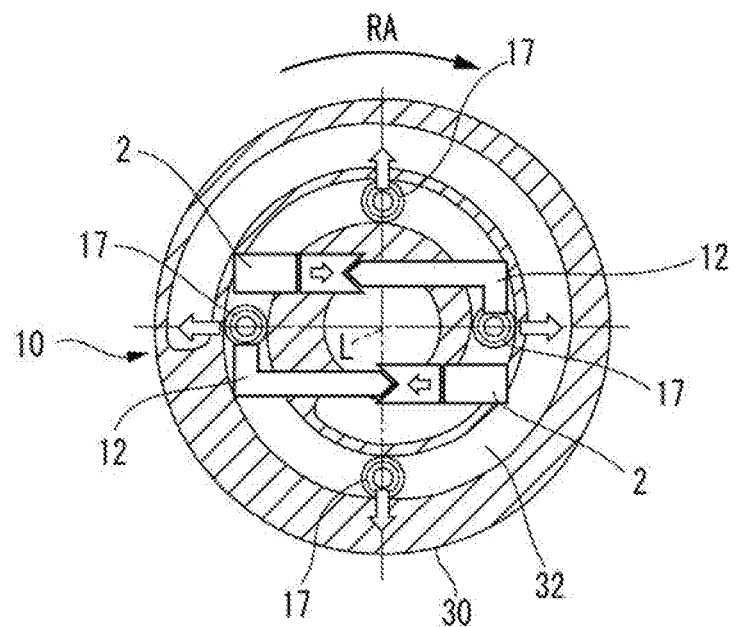
Figure 18B:
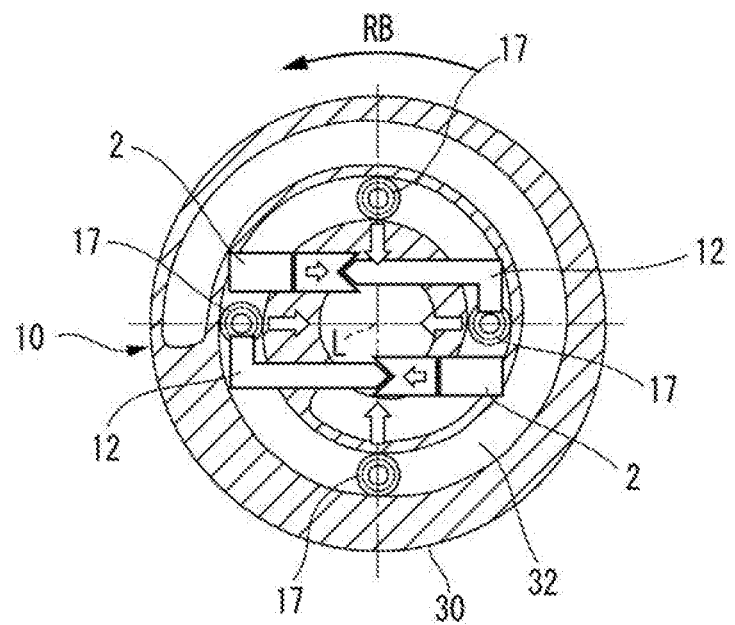

FIGS. 17A and 17B are diagrams illustrating an attachment state of a cutter holder of the peeling cutter with respect to the cam follower and to the slide piece, in which FIG. 17A is a perspective view illustrating a state before the attachment as viewed from the front, and FIG. 17B is a perspective view illustrating a state after the attachment as viewed from the front. FIGS. 18A and 18B are schematic diagrams for illustrating an opening and closing operation of the peeling cutter at the time when the cam follower is displaced outward or inward in the radial direction by relative rotation of the cam plate with respect to the cutter plate, in which FIG. 18A is a front view illustrating that the peeling cutter moves in a closing direction as the cam follower is displaced outward in the radial direction, and FIG. 18B is a front view illustrating that the peeling cutter moves in an opening direction as the cam follower is displaced inward in the radial direction.

As illustrated in FIG. 7, the pair of peeling cutters 1 is disposed on a diameter line S1 passing through the rotation axis L of the rotary head 10, and the pair of cutting cutters 2 is disposed on a diameter line S2 that is orthogonal to the diameter line S1 passing through the rotation axis L of the rotary head 10.

The peeling cutters 1 and the cutting cutters 2 perform linked movement, in which the cutting cutter 2 are opened when the peeling cutters 1 are closed as indicated by arrows in FIG. 8, and the cutting cutters 2 are closed when the peeling cutters are opened as indicated by arrows in FIG. 9.

Here, first, an attachment structure of each of the cutters 1 and 2 will be described. As illustrated in FIG. 11, four slide grooves 22 having a rectangular cross section are provided on a front surface of the disk-shaped cutter plate 20, which is a main component of the rotary head 10, along two diameter lines (S1 and S2 in FIG. 7) that are orthogonal to each other and pass through the rotation axis L. In other words, each of the four slide grooves 22 extends from the center of the cutter plate 20 to an outer peripheral end along the radial direction of the rotary head 10. Along hole 23 penetrating to a rear surface of the cutter plate 20 is formed in an inner bottom wall of the slide groove 22. The long hole 23 extends parallel to the slide groove 22. The front surface of the cutter plate 20 between the slide grooves 22 adjacent in the circumferential direction serves as an attachment surface 24 for a failing restriction plate 28 to be described below.

As illustrated in FIGS. 7 and 10, the peeling cutters 1 are fixed to cutter attachment portions 11a of the cutter holder 11 dedicated to the peeling cutter. As viewed from the rotation axis L, the cutter holder 11 dedicated to the peeling cutter is formed as a short block that exists only on the same side as the cutter 1 to be mounted. In other words, the cutter holder 11 dedicated to the peeling cutter does not extend to an opposite side with the rotation axis L sandwiched therebetween as the cutter holder 12 dedicated to the cutting cutter to be described below does. As will be described below, the cutter holder 12 dedicated to the cutting cutter is formed as a long block that extends to an opposite side of the cutter 2 to be mounted as viewed from the rotation axis L.

When the cutter attachment portion 11a is taken as an upper portion of the cutter holder 11, the cutter holder 11 dedicated to the peeling cutter is slidably supported in the radial direction of the cutter plate 20 by directly fitting a slide flange 11b formed on a lower portion of the cutter holder 11 to each of two slide grooves 22 facing each other at 180 degrees of the cutter plate 20. Each of the pair of peeling cutters 1 is fixed to the cutter attachment portion 11a of the cutter holder 11 dedicated to the peeling cutter 1, which is on the same side as the cutter 1 as viewed from the rotation axis L, thereby opening and closing in a sliding manner along the radial direction.

The cutter holder 12 dedicated to the cutting cutter is formed as a long block extending across the rotation axis L. As illustrated in FIGS. 10 and 17, in the cutter holder 12 dedicated to the cutting cutter, a cutter attachment portion 12a is provided in a portion that exists on a side of the cutter 2 to be mounted as viewed from the rotation axis L, and a slide piece attachment portion 12b is provided in a portion that exists on an opposite side of the cutter 2 to be mounted as viewed from the rotation axis L.

As illustrated in FIG. 15, among the four slide grooves 22 of the cutter plate 20, the slide flange 11b of the cutter holder 1 dedicated to the peeling cutter is not fitted, and a slide piece 13 is fitted slidably in the radial direction of the cutter plate 20 into the remaining two slide grooves 22.

As illustrated in FIGS. 15 to 17, the slide piece 13 is provided with a lower slide flange 13a that fits into the slide groove 22, and a holder attachment portion 13b on the slide flange 13b, and the slide piece attachment portion 12b of the cutter holder 12 dedicated to the cutting cutter is coupled with the holder attachment portion 13b. Accordingly, the cutter holder 12 dedicated to the cutting cutter is supported to be slidable in the radial direction of the cutter plate 20 via the slide piece 13. Therefore, as viewed from the rotation axis L, the cutting cutter 2 opens and closes along the radial direction of the cutter plate 20 via the slide piece existing on an opposite side of the cutting cutter 2, with the rotation axis L between the cutting cutter 2 and the slide piece.

The four cutter holders 11 and 12 are provided so as not to interfere with a sliding operation in the radial direction of each other. Further, in order to slide the cutter holder 11 and the slide piece 13 without falling, as illustrated in FIG. 14, the falling restriction plate 28 is attached to the falling restriction plate attachment surface 24 of the cutter plate 20. The falling restriction plate 28 restricts falling of the cutter holder 11 and the slide piece 13 by covering, with a restricting edge portion thereof, the slide flange 11b of the cutter holder 11 fitted in the slide groove 22 and the slide flange 13a of the slide piece 13 fitted in the slide groove 22.

<Cam Mechanism>

Next, a cam mechanism (cutter opening and closing mechanism 30M) that opens and closes the cutters 1 and 2 will be described.

As illustrated in FIGS. 12 and 13, on the front surface of the cam plate 30, one spiral-shaped cam groove 32 centered on the rotation axis L of the cam plate 30 is formed. All of the four cam followers 17 coupled with the cutter holders 11 and 12 are engaged with the spiral-shaped cam groove 32. The cam follower 17 is configured with a rotary roller that is rotatably mounted to a bolt 18. The bolt 18 having the cam follower 17 is coupled with the cutter holder 11 and the slide piece 13 which are disposed on the front surface side of the cutter plate 20, passing through the long hole 23 formed penetrating the inner bottom wall of the slide groove 22 (see FIGS. 16A and 16B). Therefore, the cam follower 17 is restricted so as to move only in the radial direction along the slide groove 22 of the cutter plate 20.

With this configuration, as illustrated in FIG. 13B, when the cam plate 30 rotates relative to the cutter plate 20 in the direction indicated by the arrow RA, all the four cam followers 17 are displaced outward in the radial direction. In contrast, as illustrated in FIG. 13C, when the cam plate 30 rotates relative to the cutter plate 20 in the direction indicated by the arrow RB, all the four cam followers 17 are displaced inward in the radial direction.

Of the cutter holders 11 dedicated to the peeling cutter and the cutter holders 12 dedicated to the cutting cutter, the cutter holders 11 dedicated to the peeling cutter, which are one pair of the cutter holders, are on the same side as the cutter 1 to be held with respect to the rotation axis L of the rotary head 10, and thus the holders 1 are coupled with the cam followers 17 disposed on the same side as the cutter 1 to be held respectively. Further, the cutter holders 12 dedicated to the cutting cutter, which are the other pair of the cutter holders, are coupled with the slide piece 13 on the opposite side of the cutter 2 to be held with respect to the rotation axis L of the rotary head 10, and thus the holders 12 are coupled with the cam followers 17 on the opposite side of the cutter 2 to be held via the slide piece 13.

In other words, as schematically illustrated in FIG. 18, the cutting cutter 2 on the right side in the drawing of a rotation center (rotation axis L) of the rotary head 10 is coupled with the cam follower 17 on the left side of the rotation center, and the cutting cutter 2 on the left side in the drawing of the rotation center (rotation axis L) of the rotary head 10 is coupled with the cam follower 17 on the right side of the rotation center.

By having such a coupled structure, as illustrated in FIG. 18A, when the cam plate 30 rotates relative to the cutter plate 20 in the direction indicated by the arrow RA and all the four cam followers 17 are displaced outward in the radial direction, the cutting cutter 2 is displaced in a closing direction (inward in the radial direction). In contrast, as illustrated in FIG. 18B, when the cam plate 30 rotates relative to the cutter plate 2) in the direction indicated by the arrow RB and all the four cam followers 17 are displaced inward in the radial direction, the cutting cutter 2 is displaced in an opening direction (outward in the radial direction).

Therefore, the cutting cutter 2 opens when the peeling cutter 1 closes, and the cutting cutter 2 closes when the peeling cutter 1 opens, in accordance with a rotation direction of the cam plate 30 with respect to the cutter plate 20.

The spiral-shaped cam groove 32 is formed in such a path that a difference N in distance of two cam followers 17, which are at positions facing each other at 180 degrees with the rotation axis L sandwiched therebetween, from the rotation center (rotation axis L) is equal in any relative rotation angle of the cam plate 30. Further, the pair of peeling cutters 1 and the pair of cutting cutters 2 are coupled with the cam followers 17 via the holders 11 and 12 and via the slide pieces 13, in a positional relationship in which positions of the blade edges of each pair (distance from the rotation center) are always the same with the rotation axis L sandwiched therebetween and the difference N in distance is absorbed.

<Configuration of Cutters 1 and 2>

Next, details of the cutters 1 and 2 will be described.

Figure 19A:
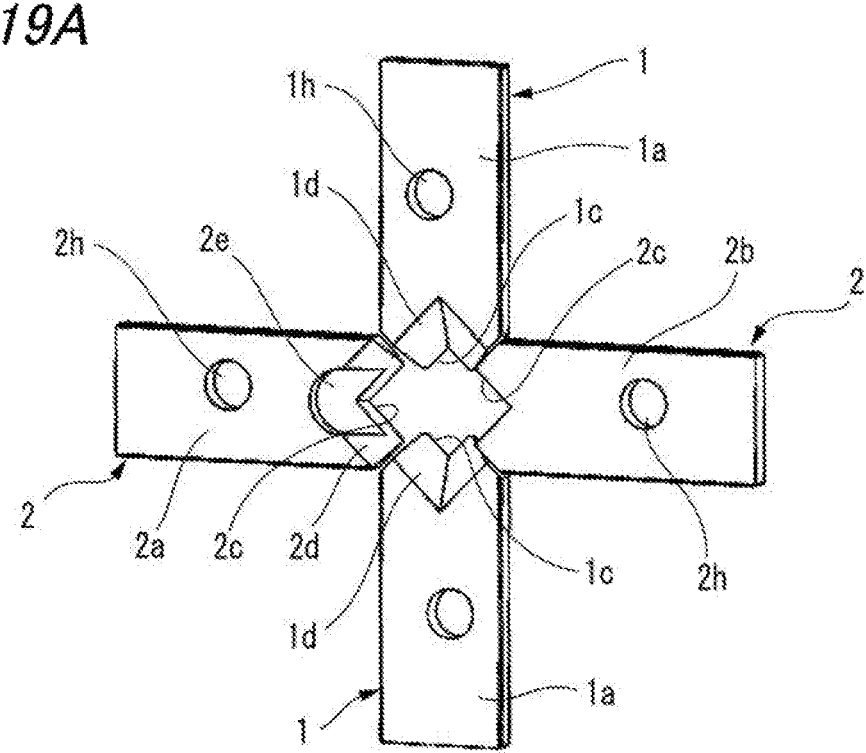
Figure 19B:
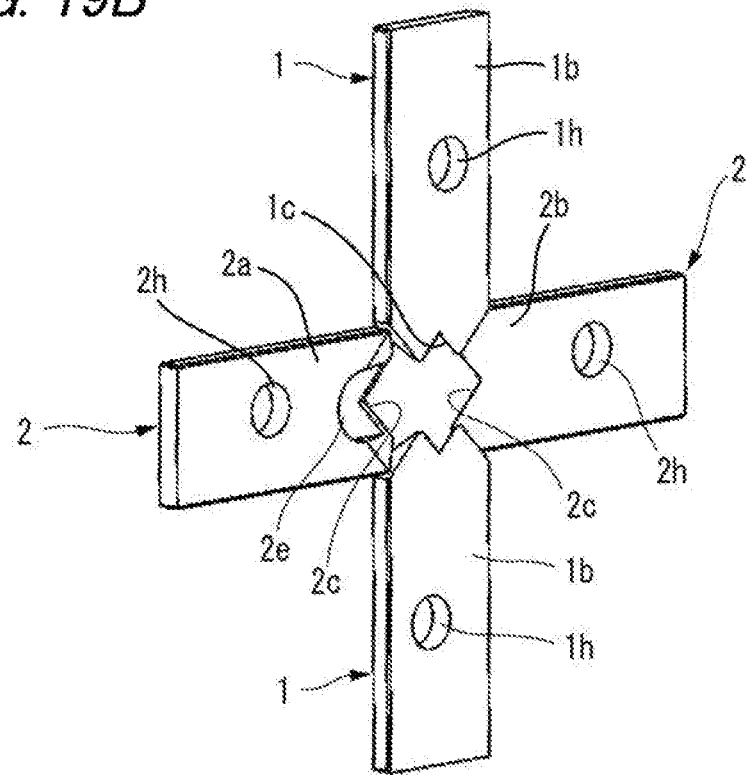
Figure 20:
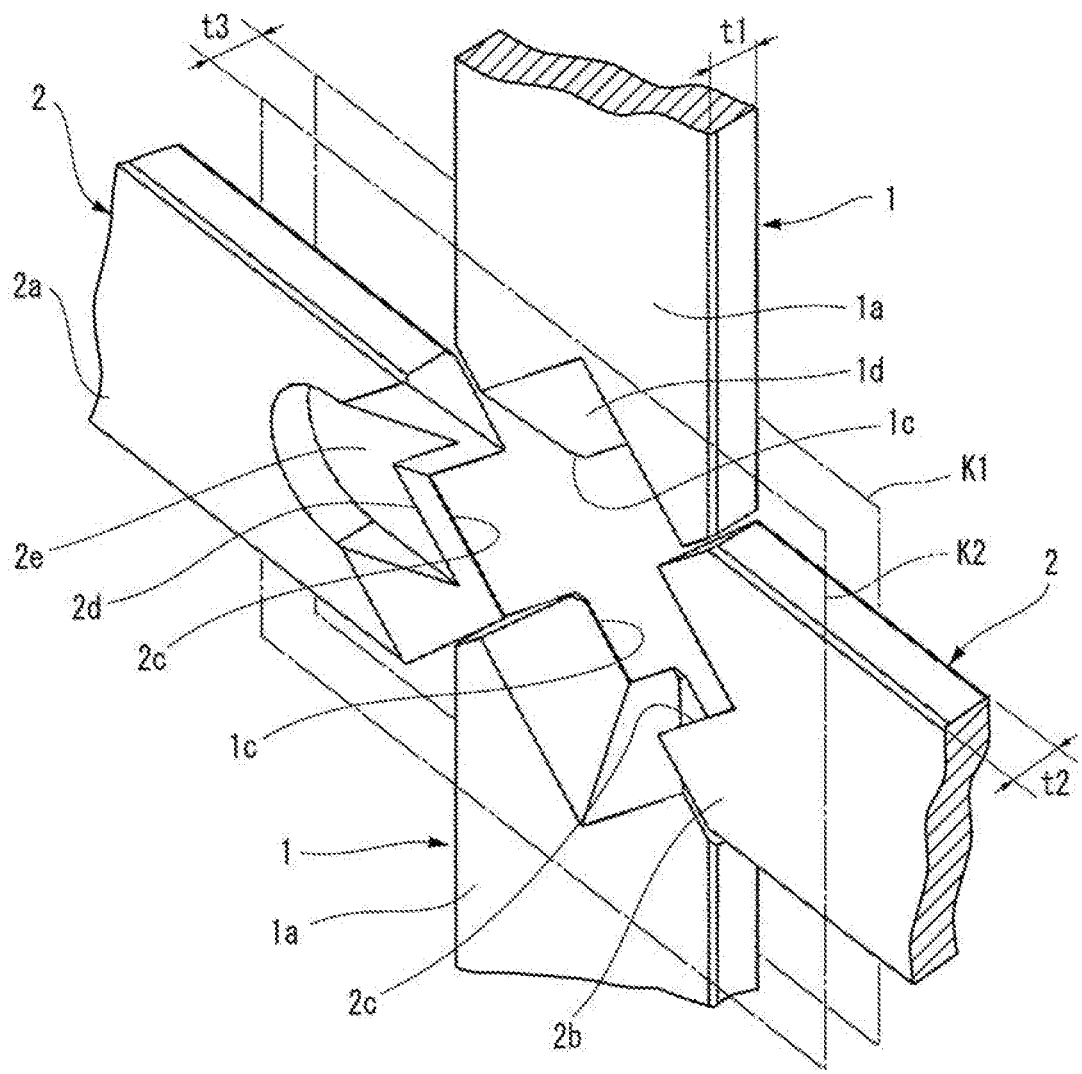
FIG. 20 is a perspective view illustrating shapes of cutting blades and the orientation of the blade surfaces, of the peeling cutter and the cutting cutter, and the positional relationship between the peeling cutter and the cutting cutter.
Figure 21A:
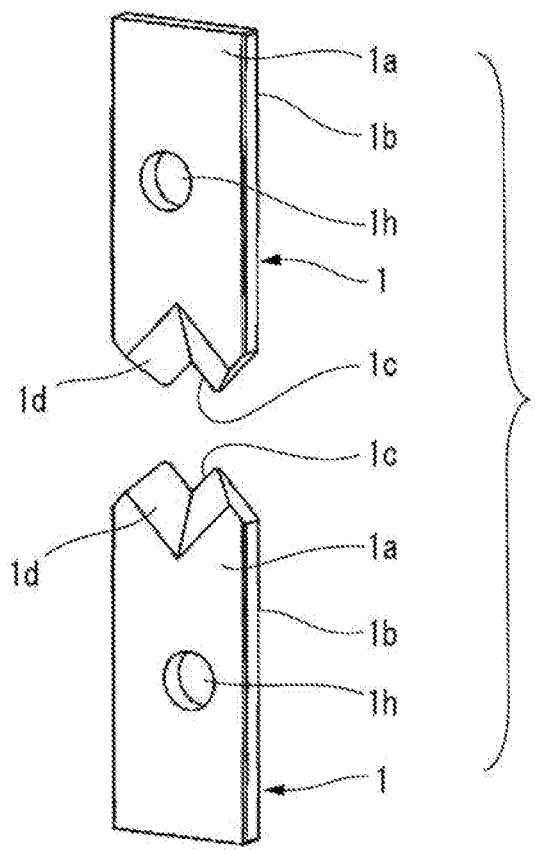
Figure 21B:
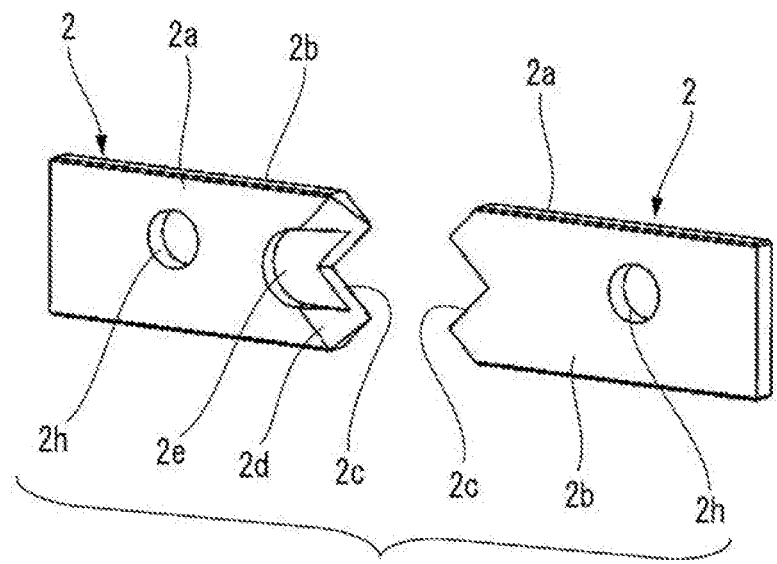
Figure 22:
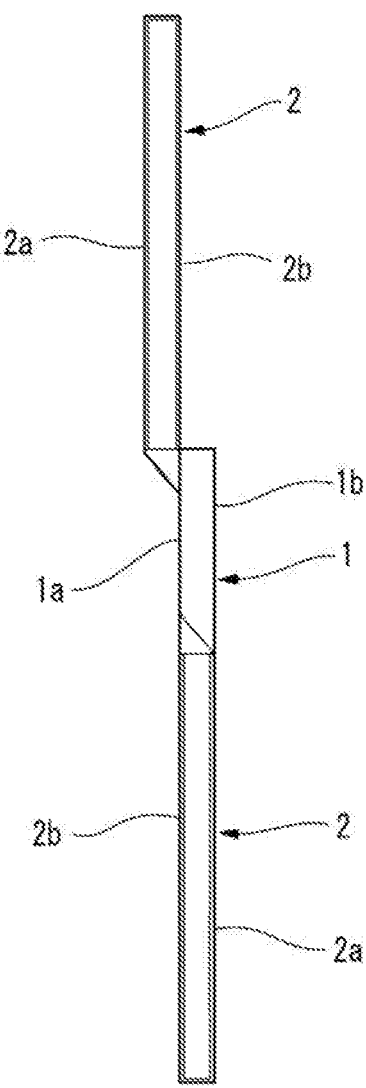
FIG. 22 is a sectional view illustrating that a cutting position (position of blade edge) of the cutting cutter is shifted with respect to the peeling cutter, as viewed from above.
Figure 23:
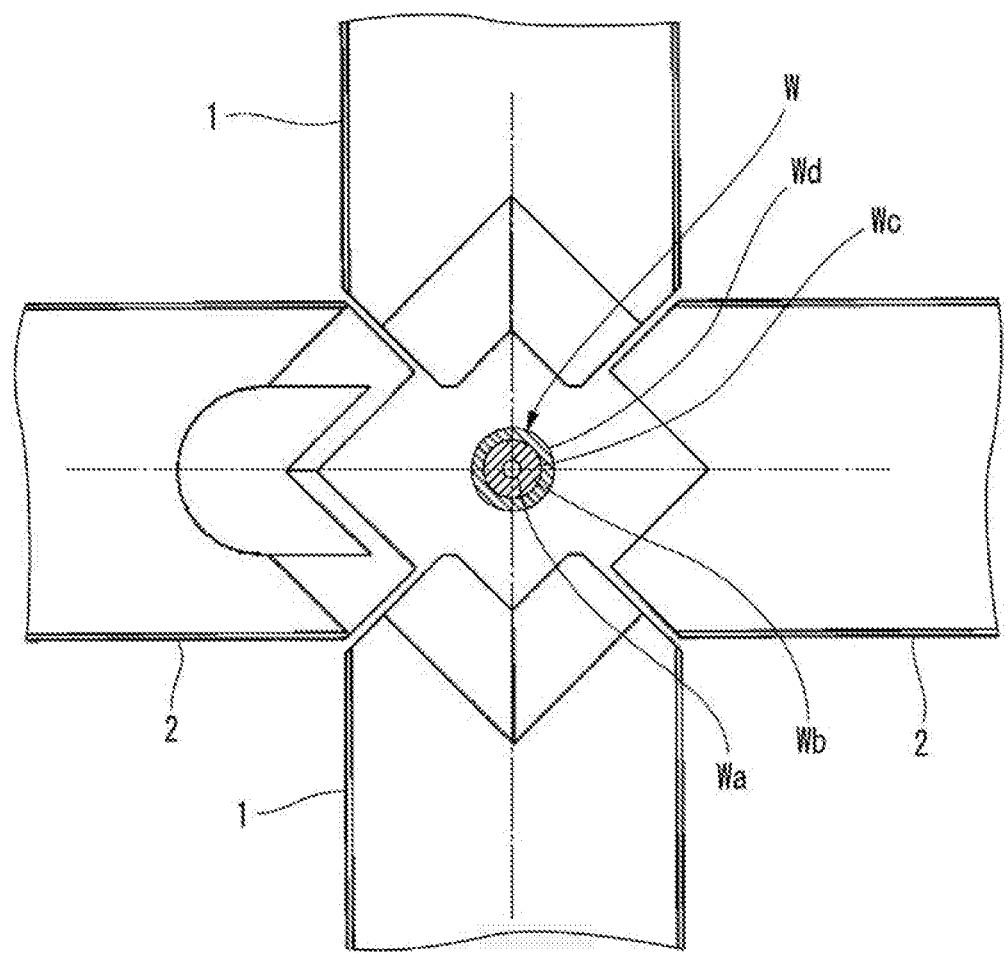
FIG. 23 is a front view illustrating relationships among the blade edges of the peeling cutter and the cutting cutter and a coaxial cable as a processing target.

FIGS. 19A and 19B are diagrams illustrating a positional relationship between the peeling cutter and the cutting cutter and orientation of blade surfaces thereof, in which FIG. 19A is a perspective view as viewed from a front (front surface) side, and FIG. 19B is a perspective view as viewed from a back (rear surface) side, FIG. 20 is a perspective view illustrating shapes of cutting blades and the orientation of the blade surfaces, of the peeling cutter and the cutting cutter, and the positional relationship between the peeling cutter and the cutting cutter. FIGS. 21A and 21B are diagrams illustrating details of the cutters, in which FIG. 21A is a perspective view illustrating the peeling cutters that are taken out, and FIG. 21B is a perspective view illustrating the cutting cutters that are taken out. FIG. 22 is a sectional view illustrating that a cutting position (position of blade edge) of the cutting cutter is shifted with respect to the peeling cutter, as viewed from above. FIG. 23 is a front view illustrating relationships among the blade edges of the peeling cutter and the cutting cutter and a coaxial cable as a processing target.

As illustrated in FIGS. 3, 4, 7, and 19 to 23, both of the pair of peeling cutters 1 are configured with a single blade in a posture in which a cutter face 1a thereof is oriented toward a base end side of a cable (the cable holding mechanism 202 side) and a cutter back 1b thereof perpendicular to the rotation axis L of the rotary head 10 is oriented toward a tip end side of the cable, and are arranged on the same plane perpendicular to the rotation axis L of the rotary head 10.

With respect to the pair of the cutting cutters 2, one is configured with a single blade in a posture in which a cutter face 2a thereof is oriented toward the tip end side of the cable and a cutter back 2b thereof perpendicular to the rotation axis L of the rotary head 10 is oriented toward the base end side of the cable; and the other is configured with a single blade in a posture in which the cutter face 2a thereof is oriented toward the base end side of the cable and the cutter back 2b thereof perpendicular to the rotation axis L of the rotary head 10 is oriented toward the tip end side of the cable. Further, as illustrated in FIG. 20, the pair of cutting cutters 2 is disposed on different planes perpendicular to the rotation axis L of the rotary head 10 such that one cutting cutter 2 whose cutter face 2a is oriented toward the base end side of the cable is positioned closer to the base end side of the cable than the other cutting cutter 2 whose cutter back 2b is oriented toward the base end side of the cable, and, moreover, cutting blades 2c are disposed so as to mesh with each other in a state where the cutter backs 2b of both of the cutting cutters 2 slide against each other.

A cutting blade 1c of the peeling cutter 1 and the cutting blade 2c of the cutting cutter 2 are both formed in a V-groove shape as viewed from the direction of the rotation axis L of the rotary head 10. As illustrated in FIG. 20, when the plane perpendicular to the rotation axis L on which the blade edge of the cutting blade 1c of the peeling cutter 1 is located is taken as K1 and the plane perpendicular to the rotation axis L on which the blade edge of the cutting blade 2c of the cutting cutter 2 is located K2, the plane K and the plane K2 are shifted by a distance of about t1 or t2 of a blade thickness. The cutter faces of the cutting blades 1c and 2c of the cutters 1 and 2 are provided with inclined blade surfaces 1d and 2d respectively. In particular, on a cutter face side of the cutting blade 2c of the cutting cutter 2, a relief recessed portion 2e is provided that reduces the thickness of the blade edge to improve cutting performance and that improves relief performance for a cutting target member. Further, fixing holes 1h and 2h for fixing the bolts to the cutter attachment portions 11a and 12a of the holders 11 and 12 are provided in the cutters 1 and 2 respectively.

As illustrated in FIGS. 1, 2, 3, and 6, the terminal processing apparatus M is provided with a suction pipe 300 and a waste receiving box 310 as units that accommodate a peeling waste and a cutting waste. The suction pipe 300 is passed through an inner hollow portion of the pipe-shaped cutter plate rotating shaft 21 provided as the inner shaft of the double-shaft structure, and sucks and removes the peeling waste of the coating and the cutting waste by the cutters 1 and 2. The suction pipe is passed through the cutter plate rotating shaft 21 so as to rotate integrally with the cutter plate rotating shaft 21, and a front end of the suction pipe 300 communicates with a rear space of the cutters 1 and 2, and a rear end of the suction pipe 300 is connected to a suction source via a joint unit or the like that allows linear movement in an axial direction and rotation of the suction pipe 300.

<Effects>

Next, effects will be described.

FIGS. 24A to 24J are diagrams illustrating a flow of a series of processing from peeling of the coating Wd to trimming cut of the coaxial electric wire W.

FIG. 24A illustrates a state before operation. The terminal portion of the coaxial electric wire W, which is the operation target, is already held in the fixed position. In this state, the rotary head 10 is rotated as indicated by an arrow R by the drive motors 41 and 51 of the first and second rotation drive mechanisms 40 and 50, and the peeling cutter 1 is rotated around the coaxial electric wire W. Around this time, the servo motor 111 of the work unit linear moving mechanism 110 is driven so as to set the position of the blade edge of the peeling cutter 1 to a cutting position for peeling. In a state before start of the operation, the peeling cutter 1 and the cutting cutter 2 (not illustrated) are at a neutral position in an opening and closing direction, and no relative rotation occurs between the cutter plate 20 and the cam plate 30. In other words, the cutter plate 20 and the cam plate 30 are synchronously rotated at the same speed.

From this state, a rotation speed of the cam plate 30 is shifted with respect to a rotation speed of the cutter plate 20 while the rotation of the cutter plate 20 is maintained. Setting of a rotation speed difference is performed through rotation control of the drive motors 41 and 51 of the first rotation drive mechanism 40 and the second rotation drive mechanism 50. As described, when a rotation speed difference is generated between the cutter plate 20 and the cam plate 30, the cam plate 30 rotates relative to the cutter plate 20.

Figure 24B:
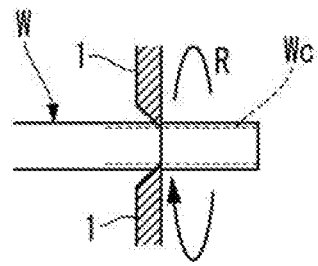

When a relative rotation direction is set to one side, the peeling cutter 1 is displaced inward, that is, toward a closing side, as indicated by an arrow Y1. With the inward displacement in the radial direction (closing operation) of the peeling cutter 1 and the rotation of the peeling cutter 1 (rotation as indicated by the arrow R), the blade edge of the peeling cutter 1 smoothly bites into the coating Wd of the coaxial electric wire W as illustrated in FIG. 24B. Before the blade edge of the peeling cutter 1 reaches the core wire Wx (in this case, the braid Wc), the inward movement in the radial direction of the peeling cutter is stopped. In other words, in a state where a relative rotation angle is maintained, the cutter plate 20 and the cam plate 30 are rotated at the same speed.

Figure 24C:
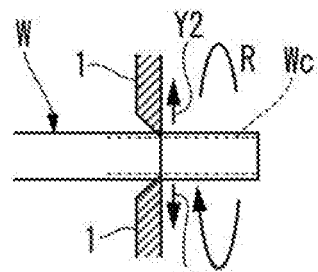

Next, at this position, as illustrated in FIG. 24C, the peeling cutter 1 is slightly opened (operation indicated by an arrow Y2), which is an operation referred to as step back. However, the blade edge is stopped at a position on an inner peripheral side of an outer diameter of the coating Wc, and the blade edge of the peeling cutter 1 is kept at this position. In this case, adjustment of the position in the radial direction of the blade edge is performed by controlling the relative rotation angle between the cutter plate 20 and the cam plate 30 (rotation speed control of the drive motors 41 and 51 of the first and second rotation drive mechanisms 40 and 50).

Figure 24D:
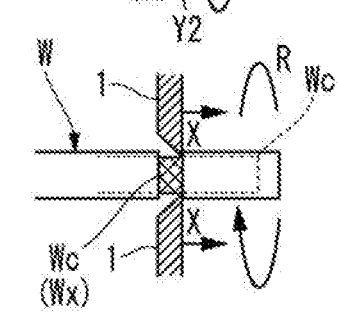
Figure 24E:
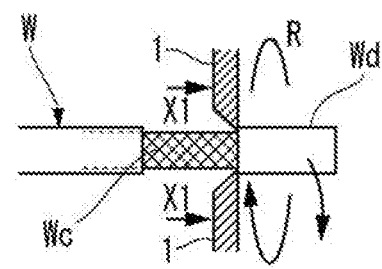
Figure 24F:
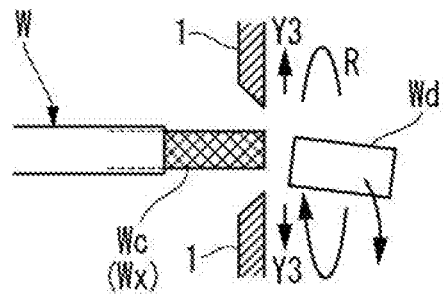
Figure 24G:
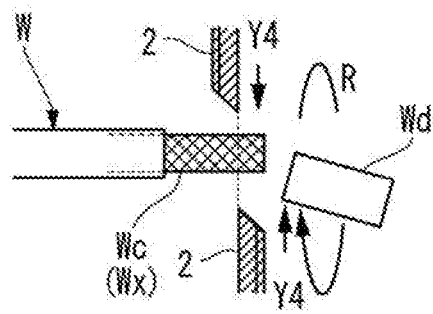

Next, in a state where the blade edge of the peeling cutter 1 is cut into the coating, the rotary head 10 and the cable holding mechanism 202 are moved in a direction away from each other. That is, the work unit MA is moved by the servo motor 111 of the work unit linear moving mechanism 110. Accordingly, the coating Wd on the tip end side is peeled off from the position where the blade edge of the peeling cutter 1 is cut. In other words, the work unit MA is retracted in the direction indicated by the arrow XB while the blade edge of the peeling cutter 1 is cut in the coating Wd as illustrated in FIGS. 24C and 24D. Further, along with the retraction of the work unit MA, the blade edge of the peeling cutter 1 retracts with respect to the coaxial electric wire W as indicated by an arrow X1 in the drawing, so that the coating Wd on the tip end side from the cut position of the blade edge is peeled off from the core wire Wx. Accordingly, the peeling process ends.

Figure 24H:
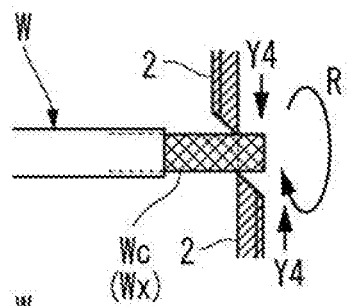
Figure 24I:
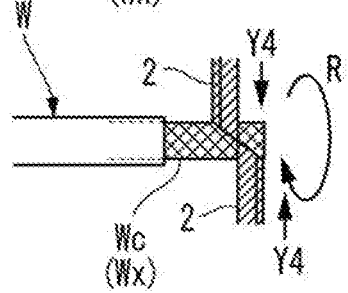
Figure 24J:
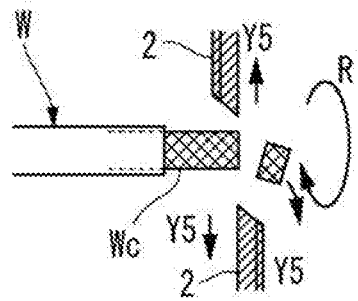

When the peeling process ends, the linear movement of the work unit MA is stopped at that position. Further, while the rotation of the rotary head 10 is maintained, the relative rotation between the cutter plate 20 and the cam plate 30 is caused so as to open the peeling cutter 1 as indicated by an arrow Y3 in FIG. 24F. In linkage with the opening operation of the peeling cutter 1, the cutting cutter 2 is closed as indicated by an arrow Y4 in FIG. 24G. Further, as illustrated in FIGS. 24H to 24J, the cutting cutter 2 is caused to bite into the tip end of the core wire Wx while rotating, and finally the pair of cutting cutters 2 mesh with each other to make an opening degree thereof zero, so that the trimming cut can be performed on the tip end of the core wire Wx. With this trimming cut, a dimension from the cutting position of the peeling cutter 1 to the tip end of the core wire Wx (that is, a protruding dimension of the core wire Wx) with respect to the coating Wd can be made uniform (trimmed).

During the above processes, by actuating the suction mechanism before the coating Wd is completely peeled off, the peeled coating waste and the cutting waste can be sucked and removed through the suction pipe 300.

As described above, according to the cable terminal processing apparatus M according to the present embodiment, both the peeling cutter 1 and the cutting cutter 2 are mounted on one rotary head 10. Therefore, while the cutters 1 and 2 are rotated on an outer peripheral side of the cable W, the peeling operation on the coating Wd and the trimming cut operation on the tip end of the core wire Wx after coating peeling can be efficiently performed in a continuous flow in the same apparatus M.

Further, the cutting cutter 2 is disposed by shifting a position thereof closer to the base end side of the cable W than the peeling cutter 1, and thus by determining a position shift amount in advance, the trimming cut can be performed on the tip end of the core wire Wx at a coating peeling completion position by closing the cutting cutter 2 without performing position adjustment in the axial direction. Therefore, it is possible to omit an extra process of adjusting the position for the trimming cut, which can contribute to improvement of efficiency.

Further, since the peeling cutter 1 and the cutting cutter 2 are separately provided, the cutters having the cutting blades effective for the peeling operation and the trimming cut operation can be used, and operation efficiency and operation quality can be improved. In particular, electric wires including coaxial cables are becoming thinner year by year, and the difficulty in processing the terminals is increased for that reason alone. Therefore, by allocating roles to the two types of cutters 1 and 2 in accordance with operation content, it is possible to improve the operation efficiency and the operation quality and also reduce wear of the cutting blade.

In addition, according to the cable terminal processing apparatus M of the embodiment, since the peeling operation can be performed using the pair of peeling cutters 1 facing each other with the rotation axis L sandwiched therebetween, it is possible to perform a stable peeling operation with high accuracy. Similarly, since the trimming cut operation is performed using the pair of cutting cutters 2 facing each other with the rotation axis L sandwiched therebetween, it is possible to perform a stable trimming cut operation with high accuracy.

In the peeling cutter 1, the cutter back 1b perpendicular to the rotation axis L is oriented toward the tip end side of the cable, and thus when movement in the axial direction for peeling is performed with the blade edge of the cutting blade 1c cut in the coating Wd, catching of the blade edge with respect to the coating Wd is stabilized and the blade edge is less likely to be detached from the coating Wd. In other words, the inclined surface (blade surface 1d) of the cutter face 1a does not come into contact with the coating Wd and the surface (cutter back 1b) perpendicular to the axis comes into contact with a cut end surface of the coating Wd, and thus even when a pull-out force is applied for peeling, the blade edge can be reliably caught with respect to the coating Wd without the cutter back 1b running over the coating Wd. Therefore, it is possible to stably and reliably perform the peeling. Further, since the cutting cutters 2 are meshing blades whose cutter backs 2b slide against each other like scissors, the trimming cut can be performed on the tip end of the core wire Wx to have a clean cross section.

According to the cable terminal processing apparatus M of the present embodiment, the cutting blade 1c of the peeling cutter 1 and the cutting blade 2c of the cutting cutter 2 are formed in a V-groove shape as viewed from the direction of the rotation axis L of the rotary head 10. Therefore, when the blade edge of the cutting blades 1c and 2c comes into contact with an outer periphery of the cylindrical coating Wd or an outer periphery of the cylindrical core wire Wx, the blade edge can be reliably cut into the coating Wd or the core wire Wx without having the coating Wd or the core wire Wx escaping from the blade edge, and a stable operation can be performed. Further, at the time of peeling the coating Wd, a pair of V-shaped cutting blades can apply the pull-out force for peeling to the coating Wd while rotating, in a state where four sides of the pair of V-shaped cutting blades are cut into the coating Wd, and thus the peeling can be stably performed with good balance without having the blade edge escaping from the coating Wd.

Further, according to the cable terminal processing apparatus M of the present embodiment, since the peeling cutter 1 and the cutting cutter 2 are mechanically linked such that one closes when the other opens, the safety can be enhanced without the risk of abnormal operation.

According to the cable terminal processing apparatus M of the present embodiment, with the movement of the spiral-shaped cam groove 32 and the cam follower 17, the peeling cutter 1 and the cutting cutter 2 can be opened and closed in a linked manner only by rotating the cam plate 30 relative to the cutter plate 20.

According to the cable terminal processing apparatus M of the present embodiment, it is possible to close the cutting cutter 2 at the time of opening the peeling cutter 1 and open the cutting cutter 2 at the time of closing the peeling cutter 1, while employing a simple configuration in which all the cam followers 17 are engaged with one spiral-shaped cam groove 32. Therefore, the structure can be simplified.

According to the cable terminal processing apparatus M of the present embodiment, when the cutter plate 20 and the cam plate 30 are synchronously rotated by the rotation control of the first and second rotation drive mechanisms 40 and 50, the peeling cutter 1 and the cutting cutter 2 can be held at the neutral position in the opening and closing direction. Further, when the cutter plate 20 and the cam plate 30 are relatively rotated to one side by the rotation control of the first and second rotation drive mechanisms 40 and 50, it is possible to close the cutting cutter 2 while opening the peeling cutter 1. When the cutter plate 20 and the cam plate 30 are relatively rotated to the other side, it is possible to open the cutting cutter 2 while closing the peeling cutter 1. In other words, since the opening and closing position and the opening and closing speed of the two sets of cutters 1 and 2 are determined by the relative rotation position and relative rotation speed between the cutter plate 20 and the cam plate 30, the opening and closing accuracy can be easily improved. The opening and closing speed of the peeling cutter 1 and the cutting cutter 2 can be changed by a method of setting a path length of the spiral-shaped cam groove 32. Therefore, in particular, a degree of advance of the blade edge at the time of closing the peeling cutter 1 can be controlled with high accuracy.

According to the cable terminal processing apparatus M of the present embodiment, by advancing and retracting the work unit MA, it is possible to position the peeling cutter 1 and the cutting cutter 2 in the axial direction with respect to the cable W and perform peeling of the coating.

According to the cable terminal processing apparatus M of the present embodiment, by actuating the suction mechanism before the coating Wd is completely peeled off in the peeling process of the coating Wd, it is possible to suck and remove the peeled coating Wd waste and the cutting waste to the outside through the suction pipe 300.

Although a case where the cable holding mechanism 202 is fixedly provided and the work unit MA is advanced and retracted with respect to the cable holding mechanism 202 is described in the embodiment described above, the cable holding mechanism 202 may be moved. In short, the cable holding mechanism 202 and the work unit MA may be configured to move relative to each other in an approaching and separating direction.

In the embodiment described above, a case is described in which the outer coat (coating) Wd of the terminal portion of the cable W is removed, and the trimming cut is performed on the tip end of the "core wire" that includes the braid (outer conductor) Wc, the inner coat (dielectric) Wb, and the inner conductor (center conductor) Wa after removal of the outer coat. However, the concept of "coating" of a removal target includes a case where the inner coat (dielectric) Wb of the coaxial cable is taken as a coating, and the concept of "core wire" to be subjected to trimming cut includes a case where the inner conductor (center conductor) Wa is taken as a core wire. Further, a case where an insulation outer coat of a normal single-core covered electric wire is taken as a coating is included, and a case where a conductor is taken as a core wire is included. In other words, which range is referred to as a "core wire" and which range is referred to as a "coating" is determined in accordance with an operation case.

In the embodiment described above, the case where the cable is an electric wire is assumed and described, and alternatively an optical cable or the like other than the electric wire is also included in the operation target.

Here, characteristics of the cable terminal processing apparatus according to the embodiment of the invention described above will be briefly summarized in the following [1] to [9].

[1] A cable terminal processing apparatus (M) that peels a coating (Wd) around a core wire (Wx) in a terminal portion of a cable (W) and performs trimming cut on a tip end of a core wire (Wx) after coating peeling, the cable terminal processing apparatus (M) including:

a rotation shaft (21, 31) that has, at a front end thereof, a rotary head (10) rotatable about a rotation axis (L)

a rotation drive mechanism (40, 50) that drives the rotary head (10) to rotate;

a cable holding mechanism (202) that holds and fixes, in front of the rotary head (10), the terminal portion of the cable (W) in a state of being aligned with a rotation axis (L) of the rotation shaft (21, 31) and in a posture in which a tip end thereof is oriented toward a rear side of the rotary head (10);

a peeling cutter (1) that is mounted on the rotary head (10) so as to be displaceable in a radial direction of the rotary head (10) and causes a blade edge thereof to cut into a coating of the terminal portion of the cable (W) held by the cable holding mechanism (202) by being displaced inward in the radial direction; and a cutting cutter (2) that is mounted on the rotary head (10) so as to be displaceable in the radial direction of the rotary head (10), is disposed closer to a base end side of the cable (W) than the peeling cutter (1), and performs trimming cut on the tip end of the core wire (Wx) after coating peeling by being displaced inward in the radial direction;

a cutter opening and closing mechanism (30M) that opens the peeling cutter (1) and the cutting cutter (2) outward in the radial direction and closes the peeling cutter (1) and the cutting cutter (2) inward in the radial direction, in a state where the rotary head (10) is rotating; and an axial direction moving mechanism (110) that has a function of moving the rotary head (10) and the cable holding mechanism (202) relative to each other in an axial direction of the rotation shaft (21, 31), positions a blade edge of the peeling cutter (1) and the cutting cutter (2) in the axial direction with respect to the cable (W) by moving and stopping, and peels the coating (Wd) on a tip end side by moving the rotary head (10) and the cable holding mechanism (202) in a direction away from each other in a state where the blade edge of the peeling cutter (1) is cut into the coating (Wd) of the terminal portion of the cable (W).

[2] The cable terminal processing apparatus (M) according to the above [1], in which the peeling cutter (1) is disposed in a pair at positions facing each other with the rotation axis (L) of the rotary head (10) sandwiched therebetween, the cutting cutter (2) is disposed in a pair at positions between the pair of peeling cutters (1) in a circumferential direction of the rotary head (10), that is, at positions facing each other with the rotation axis (L) of the rotary head (10) sandwiched therebetween, both of the pair of peeling cutters (1) are configured with a single blade in a posture in which a cutter face (1a) thereof is oriented toward a base end side of the cable (W) and a cutter back (1b) thereof perpendicular to the rotation axis (L) of the rotary head (10) is oriented toward a tip end side of the cable (W), and are disposed on a same plane perpendicular to the rotation axis (L) of the rotary head (10), and the pair of cutting cutters (2), one being configured with a single blade in a posture in which a cutter face (2a) thereof is oriented toward the tip end side of the cable (W) and a cutter back (2b) thereof perpendicular to the rotation axis (L) of the rotary head (10) is oriented toward the base end side of the cable (W), and the other being configured with a single blade in a posture in which the cutter face (2a) thereof is oriented toward the base end side of the cable (W) and the cutter back (2b) thereof perpendicular to the rotation axis (L) of the rotary head (10) is oriented toward the tip end side of the cable (W), is disposed on different planes perpendicular to the rotation axis (L) of the rotary head (10) and is disposed such that cutting blades thereof are capable of meshing with each other in a state where the cutter backs (2b) of both of the cutting cutters (2) slide against each other.

[3] The cable terminal processing apparatus (M) according to the above [2], in which each cutting blade (1c, 2c) of the peeling cutter (1) and the cutting cutter (2) is formed in a V-groove shape as viewed from a direction of the rotation axis (L) of the rotary head (10).

[4] The cable terminal processing apparatus (M) according to the above [2] or [3], in which the cutter opening and closing mechanism (30M) has a mechanical linked structure of opening the cutting cutter (2) at the time of closing the peeling cutter (1) and closing the cutting cutter (2) at the time of opening the peeling cutter (1).

[5] The cable terminal processing apparatus (M) according to the above [4], in which the rotary head (10) includes a cutter plate (20) on a front side on which cutter holders (11, 12) that hold the peeling cutter (1) and the cutting cutter (2) respectively are slidably mounted in the radial direction of the rotary head (10), and a cam plate (30) that is disposed on a back side thereof and on whose front surface a cam groove (32) is formed, and a cam follower (17) coupled with each cutter holder (11,12) is engaged with the cam groove (32), and the cutter opening and closing mechanism (30M) is configured to include the cam plate (30) and the cutter holder (11, 12), which is coupled with the cam follower (17) so as to be slidable in the radial direction of the rotary head (10), and when the cam plate (30) is rotated relative to the cutter plate (20), displaces each cutter (1, 2) inward in the radial direction and outward in the radial direction by cam action of the cam groove (32) and the cam follower (17).

The cable terminal processing apparatus (M) according to the above [5], in which, as the cam groove, one spiral-shaped cam groove (32) centered on a rotation axis (L) of the cam plate (30) is formed on the front surface of the cam plate (30), and all the cam followers (17) are engaged with the spiral-shaped cam groove (32), and of a pair of cutter holders (11) that hold the peeling cutter (1) and a pair of cutter holders (12) that hold the cutting cutter (2), one pair of cutter holders (11) is coupled with the cam followers (17) respectively which are disposed on a same side as a cutter (1) to be held with respect to the rotation axis (L) of the rotary head (10), and the other pair of cutter holders (12) is coupled with the cam followers (17) respectively which are disposed on an opposite side of a cutter (2) to be held with respect to the rotation axis (L) of the rotary head (10).

[7] The cable terminal processing apparatus (M) according to the above [5] or [6], in which a cutter plate rotating shaft (21) integrated with the cutter plate (20) and a cam plate rotating shaft (31) integrated with the cam plate (30), which are provided as rotating shafts of the rotary head (10), form a double-shaft structure in which both shafts are driven to rotate with the cutter plate rotating shaft (21) being an inner shaft and the cam plate rotating shaft (31) being an outer shaft; as the rotation drive mechanism, a first rotation drive mechanism (40) that drives the cutter plate rotating shaft (21) to rotate is coupled with the cutter plate rotating shaft (21), and a second rotation drive mechanism (50) that drives the cam plate rotating shaft (31) to rotate is coupled with the cam plate rotating shaft (31); and a relative rotation is caused between the cutter plate (20) and the cam plate (30) by independent rotation control of the first and second rotation drive mechanisms (40, 50).

[8] The cable terminal processing apparatus (M) according to the above [7], in which the axial direction of the rotation shaft (21, 31) is set to a horizontal direction, a work unit (MA) is provided on a base member (100) so as to be linearly movable along the axial direction of the rotation shaft (21, 31) and the cable holding mechanism (202) is fixedly disposed in front of the work unit (MA), whereby the axial direction moving mechanism (111) is configured as a mechanism that linearly moves the work unit (MA), and the rotation shaft (21, 31), the rotation drive mechanism (40, 50), and the cutter opening and closing mechanism (30M) are mounted on the work unit (MA), The cable terminal processing apparatus (M) according to the above (7) or (8), in which a suction mechanism that is passed through a hollow portion of the cutter plate rotating shaft (21) provided as the inner shaft of the double-shaft structure, and sucks and removes a peeling waste of the coating (Wd) by the cutter (1, 2),

What is claimed is:

1. A cable terminal processing apparatus that peels a coating around a core wire in a terminal portion of a cable and performs trimming cut on a tip end of the core wire after coating peeling, the cable terminal processing apparatus comprising:
   a rotation shaft that has, at a front end thereof, a rotary head rotatable about a rotation axis;
   a rotation drive mechanism that drives the rotary head to rotate;
   a cable holding mechanism that holds and fixes, in front of the rotary head, the terminal portion of the cable in a state of being aligned with a rotation axis of the rotation shaft and in a posture in which a tip end thereof is oriented toward a rear side of the rotary head;
   a peeling cutter that is mounted on the rotary head so as to be displaceable in a radial direction of the rotary head and causes a blade edge thereof to cut into a coating of the terminal portion of the cable held by the cable holding mechanism by being displaced inward in the radial direction; and a cutting cutter that is mounted on the rotary head so as to be displaceable in the radial direction of the rotary head, is disposed closer to a base end side of the cable than the peeling cutter, and performs trimming cut on the tip end of the core wire after coating peeling by being displaced inward in the radial direction;
   a cutter opening and closing mechanism that opens the peeling cutter and the cutting cutter outward in the radial direction and closes the peeling cutter and the cutting cutter inward in the radial direction, in a state where the rotary head is rotating; and
   an axial direction moving mechanism that has a function of moving the rotary head and the cable holding mechanism relative to each other in an axial direction of the rotation shaft, positions a blade edge of the peeling cutter and the cutting cutter in the axial direction with respect to the cable by moving and stopping, and peels the coating on a tip end side by moving the rotary head and the cable holding mechanism in a direction away from each other in a state where the blade edge of the peeling cutter is cut into the coating of the terminal portion of the cable.

2. The cable terminal processing apparatus according to claim 1, wherein
   the peeling cutter is disposed in a pair at positions facing each other with the rotation axis of the rotary head sandwiched therebetween, the cutting cutter is disposed in a pair at positions between the pair of peeling cutters in a circumferential direction of the rotary head, that is, at positions facing each other with the rotation axis of the rotary head sandwiched therebetween, both of the pair of peeling cutters are configured with a single blade in a posture in which a cutter face thereof is oriented toward a base end side of the cable and a cutter back thereof perpendicular to the rotation axis of the rotary head is oriented toward a tip end side of the cable, and are disposed on a same plane perpendicular to the rotation axis of the rotary head, and the pair of cutting cutters, one being configured with a single blade in a posture in which a cutter face thereof is oriented toward the tip end side of the cable and a cutter back thereof perpendicular to the rotation axis of the rotary head is oriented toward the base end side of the cable, and the other being configured with a single blade in a posture in which the cutter face thereof is oriented toward the base end side of the cable and the cutter back thereof perpendicular to the rotation axis of the rotary head is oriented toward the tip end side of the cable, is disposed on different planes perpendicular to the rotation axis of the rotary head and is disposed such that cutting blades thereof are capable of meshing with each other in a state where the cutter backs of both of the cutting cutters slide against each other.

3. The cable terminal processing apparatus according to claim 2, wherein
each cutting blade of the peeling cutter and the cutting cutter is formed in a V-groove shape as viewed from a direction of the rotation axis of the rotary head.

4. The cable terminal processing apparatus according to claim 2, wherein
the cutter opening and closing mechanism has a mechanical linked structure of opening the cutting cutter at the time of closing the peeling cutter and closing the cutting cutter at the time of opening the peeling cutter.

5. The cable terminal processing apparatus according to claim 4, wherein
the rotary head includes a cutter plate on a front side on which cutter holders that hold the peeling cutter and the cutting cutter respectively are slidably mounted in the radial direction of the rotary head, and a cam plate that is disposed on a back side thereof and on whose front surface a cam groove is formed, and a cam follower coupled with each cutter holder is engaged with the cam groove, and the cutter opening and closing mechanism is configured to include the cam plate and the cutter holder, which is coupled with the cam follower so as to be slidable in the radial direction of the rotary head, and when the cam plate is rotated relative to the cutter plate, displaces each cutter inward in the radial direction and outward in the radial direction by cam action of the cam groove and the cam follower.

6. The cable terminal processing apparatus according to claim 5, wherein
as the cam groove, one spiral-shaped cam groove centered on a rotation axis of the cam plate is formed on the front surface of the cam plate, and all the cam followers are engaged with the spiral-shaped cam groove, and of a pair of cutter holders that hold the peeling cutter and a pair of cutter holders that hold the cutting cutter, one pair of cutter holders is coupled with the cam followers respectively which are disposed on a same side as a cutter to be held with respect to the rotation axis of the rotary head, and the other pair of cutter holders is coupled with the cam followers respectively which are disposed on an opposite side of a cutter to be held with respect to the rotation axis of the rotary head.

7. The cable terminal processing apparatus according to claim 5, wherein
a cutter plate rotating shaft integrated with the cutter plate and a cam plate rotating shaft integrated with the cam plate, which are provided as rotating shafts of the rotary head, form a double-shaft structure in which both shafts are driven to rotate with the cutter plate rotating shaft being an inner shaft and the cam plate rotating shaft being an outer shaft; as the rotation drive mechanism, a first rotation drive mechanism that drives the cutter plate rotating shaft to rotate is coupled with the cutter plate rotating shaft, and a second rotation drive mechanism that drives the cam plate rotating shaft to rotate is coupled with the cam plate rotating shaft; and a relative rotation is caused between the cutter plate and the cam plate by independent rotation control of the first and second rotation drive mechanisms.

8. The cable terminal processing apparatus according to claim 7, wherein
the axial direction of the rotation shaft is set to a horizontal direction, a work unit is provided on a base member so as to be linearly movable along the axial direction of the rotation shaft and the cable holding mechanism is fixedly disposed in front of the work unit, whereby the axial direction moving mechanism is configured as a mechanism that linearly moves the work unit, and the rotation shaft, the rotation drive mechanism, and the cutter opening and closing mechanism are mounted on the work unit.

9. The cable terminal processing apparatus according to claim 7, wherein
a suction mechanism that is passed through a hollow portion of the cutter plate rotating shaft provided as the inner shaft of the double-shaft structure, and sucks and removes a peeling waste of the coating by the cutter.

* * * * *